(12) United States Patent
Kao et al.

(10) Patent No.: US 7,549,219 B2
(45) Date of Patent: Jun. 23, 2009

(54) AUTOMATIC ASSEMBLING SYSTEM AND METHOD FOR CAMERA LENS UNITS

(75) Inventors: Po-Song Kao, Taichung (TW); Ying-Chang Chen, Taichung (TW); Yung-I Chang, Taichung (TW); En-Tzu Cheng, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 668 days.

(21) Appl. No.: 11/031,157

(22) Filed: Jan. 7, 2005

(65) Prior Publication Data

US 2005/0231819 A1   Oct. 20, 2005

(30) Foreign Application Priority Data

Apr. 1, 2004   (TW) ............................... 93109074 A

(51) Int. Cl.
*B23P 19/00* (2006.01)

(52) U.S. Cl. .............................. 29/792; 29/783; 29/785; 29/791; 29/430

(58) Field of Classification Search ................... 29/771, 29/783, 785, 791, 792, 429, 430

See application file for complete search history.

(56) References Cited

U.S. PATENT DOCUMENTS 6,389,672 B1 *  5/2002  Ishii et al. ..................... 29/430

* cited by examiner

*Primary Examiner*—David P Bryant
*Assistant Examiner*—Christopher M Koehler
(74) *Attorney, Agent, or Firm*—DLA Piper LLP (US)

(57) ABSTRACT

An automatic assembling system and method for camera lens units are provided. The system includes a main workstation, a barrel-feeding station, a lens-feeding station, and a camera lens-removing station. The method includes (A) operating a plurality of barrel-clamping units of the main workstation cyclically and intermittently along a feeding direction; (B) moving a plurality of barrels from a barrel standby area of the barrel-feeding station onto the barrel-clamping units in sequence; (C) moving a plurality of lens units from a lens standby area assembly of the lens-feeding station into the barrels to form the camera lens units; and (D) moving the camera lens units from the barrel-clamping units into a camera lens-collecting area of the camera lens-removing station. The steps (B, C, D) are performed in cooperation with the intermittent operations of the barrel-clamping units.

3 Claims, 40 Drawing Sheets

AUTOMATIC ASSEMBLING SYSTEM AND METHOD FOR CAMERA LENS UNITS

CROSS-REFERENCE TO RELATED APPLICATION

This application claims priority of Taiwanese Application No. 093109074, filed on Apr. 1, 2004.

BACKGROUND OF THE INVENTION

1. Field of the Invention

This invention relates to a camera lens, and more particularly to an automatic assembling system and method for camera lens units.

2. Description of the Related Art

Nowadays, a mobile phone is typically provided with a camera lens unit for taking photographs. Referring to FIG. 1, a conventional camera lens unit for a mobile phone (not shown) is shown to include a barrel 1 and two lenses 2. The lenses 2 are placed manually into the barrel 1 by means of a suction nozzle (not shown) at a relatively slow production rate (30~60 seconds per piece), thereby resulting in a significant increase in the manufacturing costs. Furthermore, the manual operation is apt to cause assembly errors resulting from human negligence.

SUMMARY OF THE INVENTION

The object of this invention is to provide a highly efficient automatic assembling system and method for camera lens units, which can reduce the manufacturing costs.

According to an aspect of this invention, an automatic assembling system for camera lens units includes a main workstation, a barrel-feeding station, at least one lens-feeding station, and a camera lens-removing station. The main workstation includes a plurality of barrel-clamping units operable cyclically and intermittently along a feeding direction. The barrel-feeding station is disposed adjacent to the main workstation, and includes a barrel-feeding device, and a barrel standby area adapted to receive a plurality of barrels. The barrel-feeding device cooperates with intermittent operations of the barrel-clamping units to move the barrels from the barrel standby area onto the barrel-clamping units in sequence. The lens-feeding station is disposed adjacent to the main workstation, and includes a lens-feeding device, and a lens standby area adapted to receive a plurality of lenses. The lens-feeding device cooperates with the intermittent operations of the barrel-clamping units to move the lenses into the barrels respectively and sequentially so as to form the camera lens units. The camera lens-removing station is disposed adjacent to the main workstation such that the barrel-feeding station, the lens-feeding station, and the camera lens-removing station are arranged along the feeding direction, and includes a camera lens-removing device, and a camera lens-collecting area. The camera lens-removing device cooperates with the intermittent operations of the barrel-clamping units to move the camera lens units from the barrel-clamping units into the camera lens-collecting area in sequence.

According to another aspect of this invention, an automatic assembling method for camera lens units includes the steps of:

(A) operating a plurality of barrel-clamping units cyclically and intermittently along a feeding direction;

(B) cooperating with intermittent operations of the barrel-clamping units to move a plurality of barrels from a barrel standby area onto the barrel-clamping units in sequence;

(C) cooperating with the intermittent operations of the barrel-clamping units to move a plurality of lens units from a lens standby area unit into the barrels respectively and sequentially to form the camera lens units; and (D) cooperating with the intermittent operations of the barrel-clamping units to move the camera lens units respectively and sequentially from the barrel-clamping units into a camera lens-collecting area.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
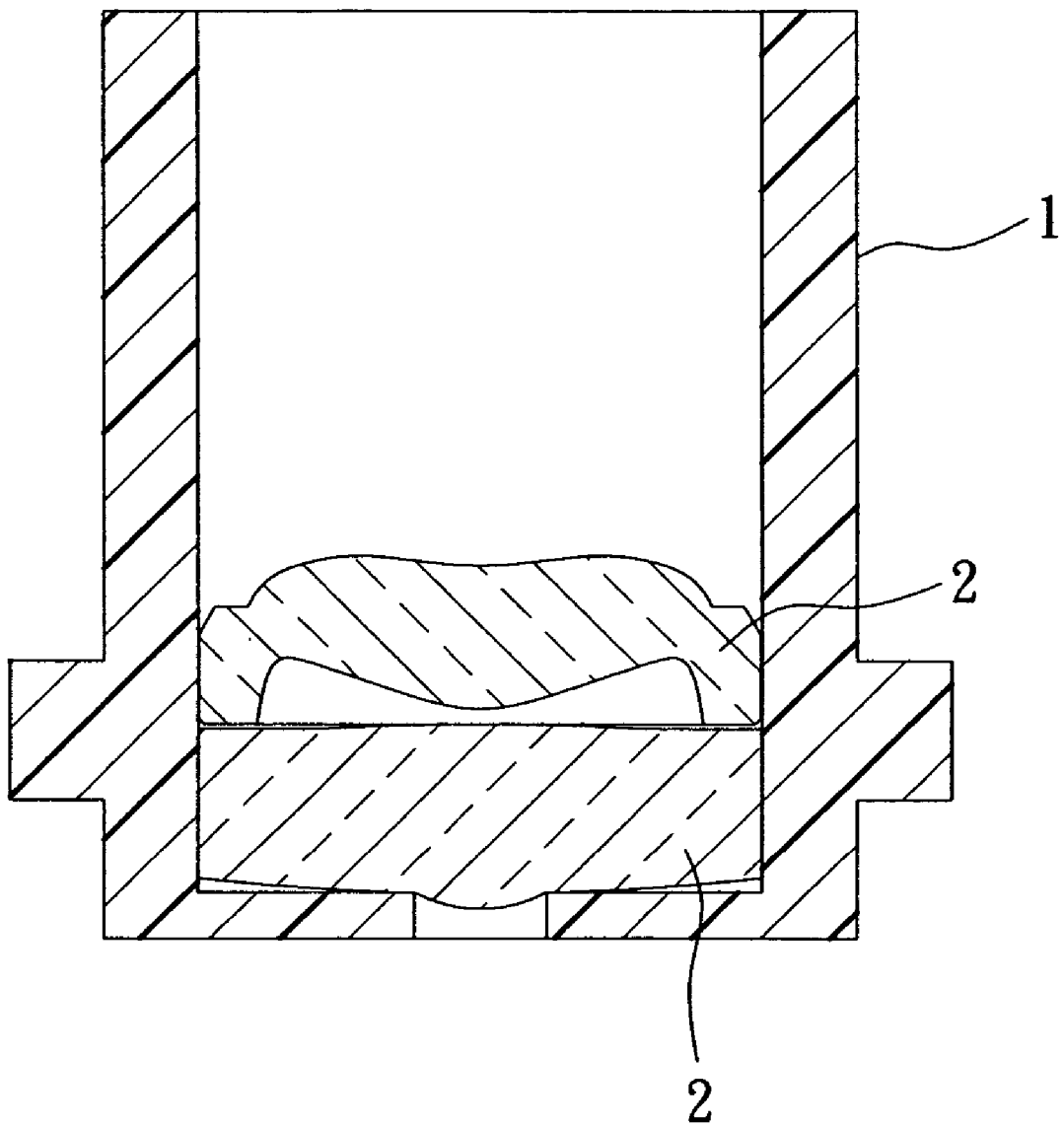
FIG. 1 is a schematic sectional view of a conventional camera lens unit.
Figure 2:
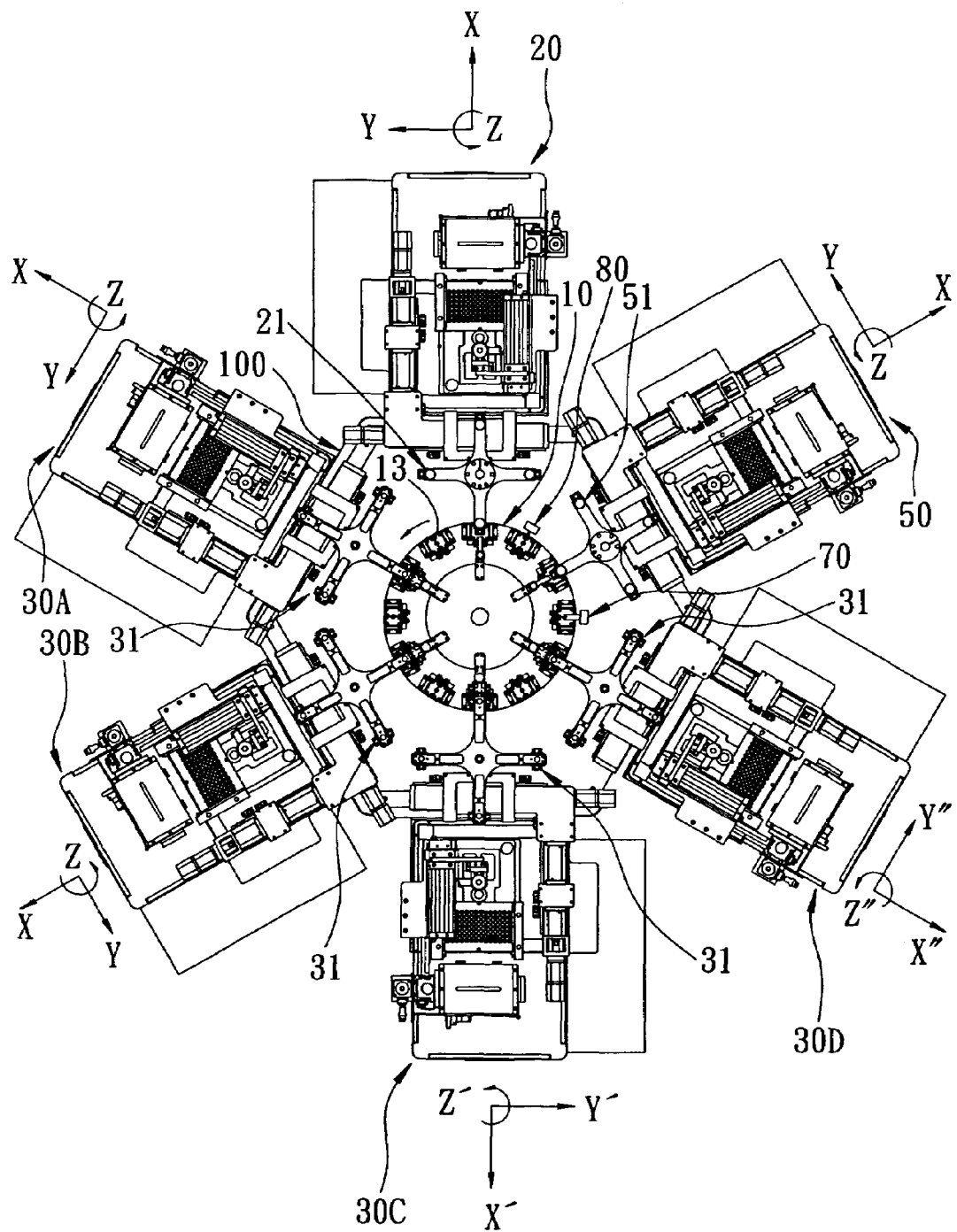
FIG. 2 is a schematic top view of the preferred embodiment of an automatic assembling system according to this invention.
Figure 3:
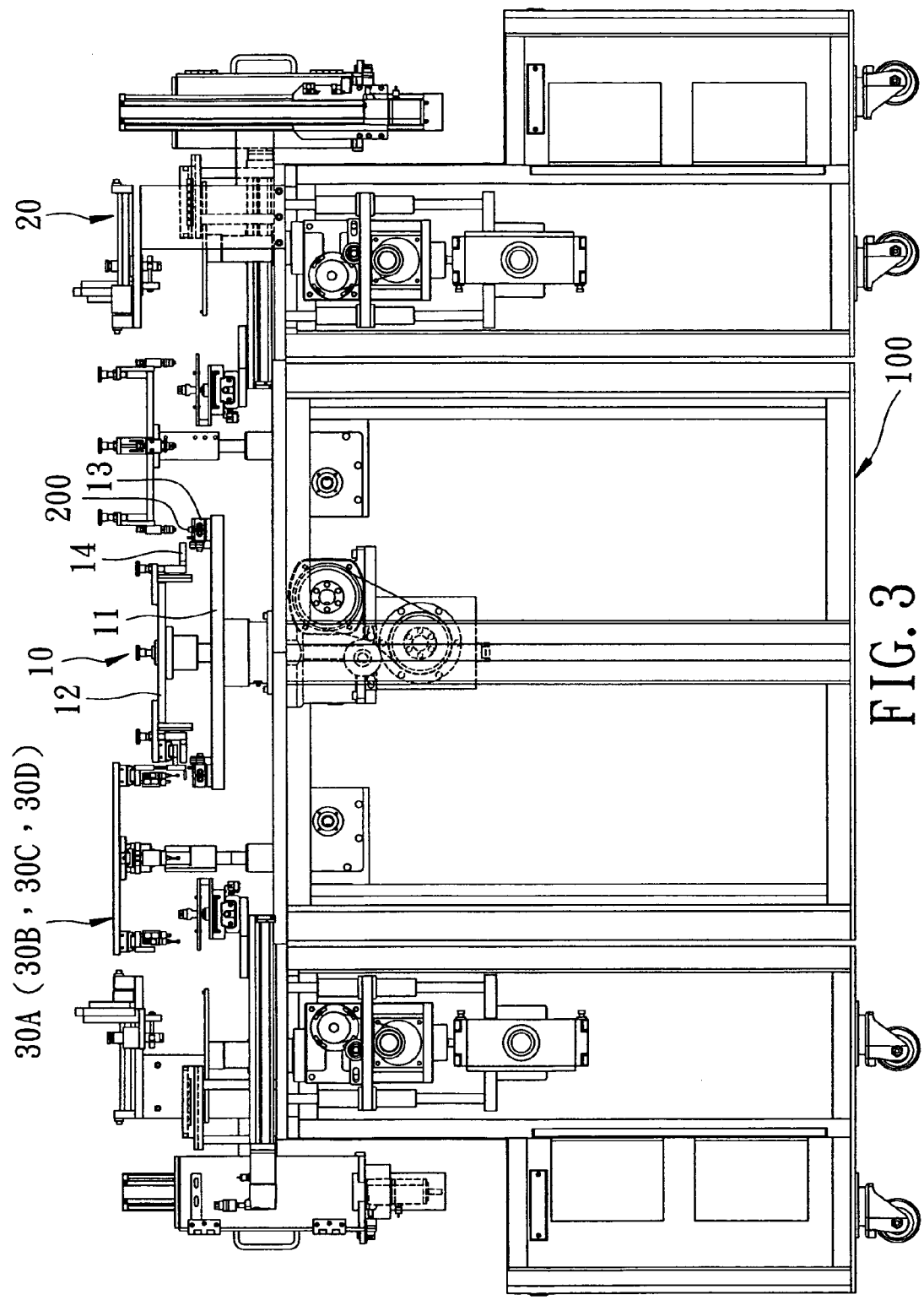
FIG. 3 is a schematic side view of the preferred embodiment.
Figure 4:
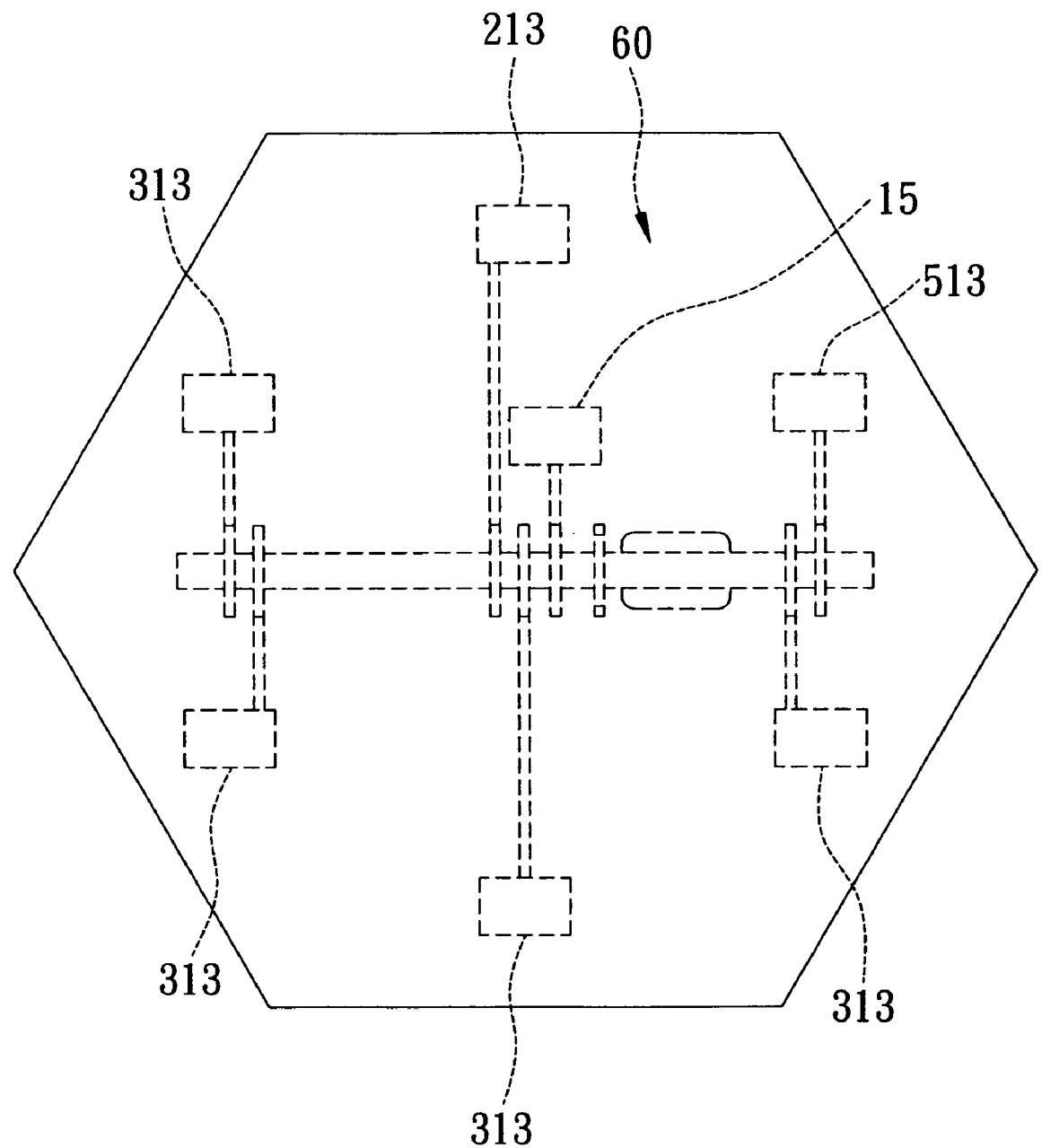
FIG. 4 is a schematic top view of a power driven unit of the preferred embodiment.

Referring to FIGS. 2, 3, and 4, the preferred embodiment of an automatic assembling system is shown to include a machine bed 100, a main workstation 10, a barrel-feeding station 20, a lens-feeding assembly consisting of four lens-feeding stations (30A, 30B, 30C, and 30D), a camera lens-removing station 50, a power driven unit 60, a height-detecting unit 70, and a camera lens-detecting unit 80. The stations/units (20, 30A, 30B, 30C, 30D, 70, 50, 80) are disposed around the main workstation 10, and are arranged along a feeding direction (F) (see FIG. 33).

Figure 5:
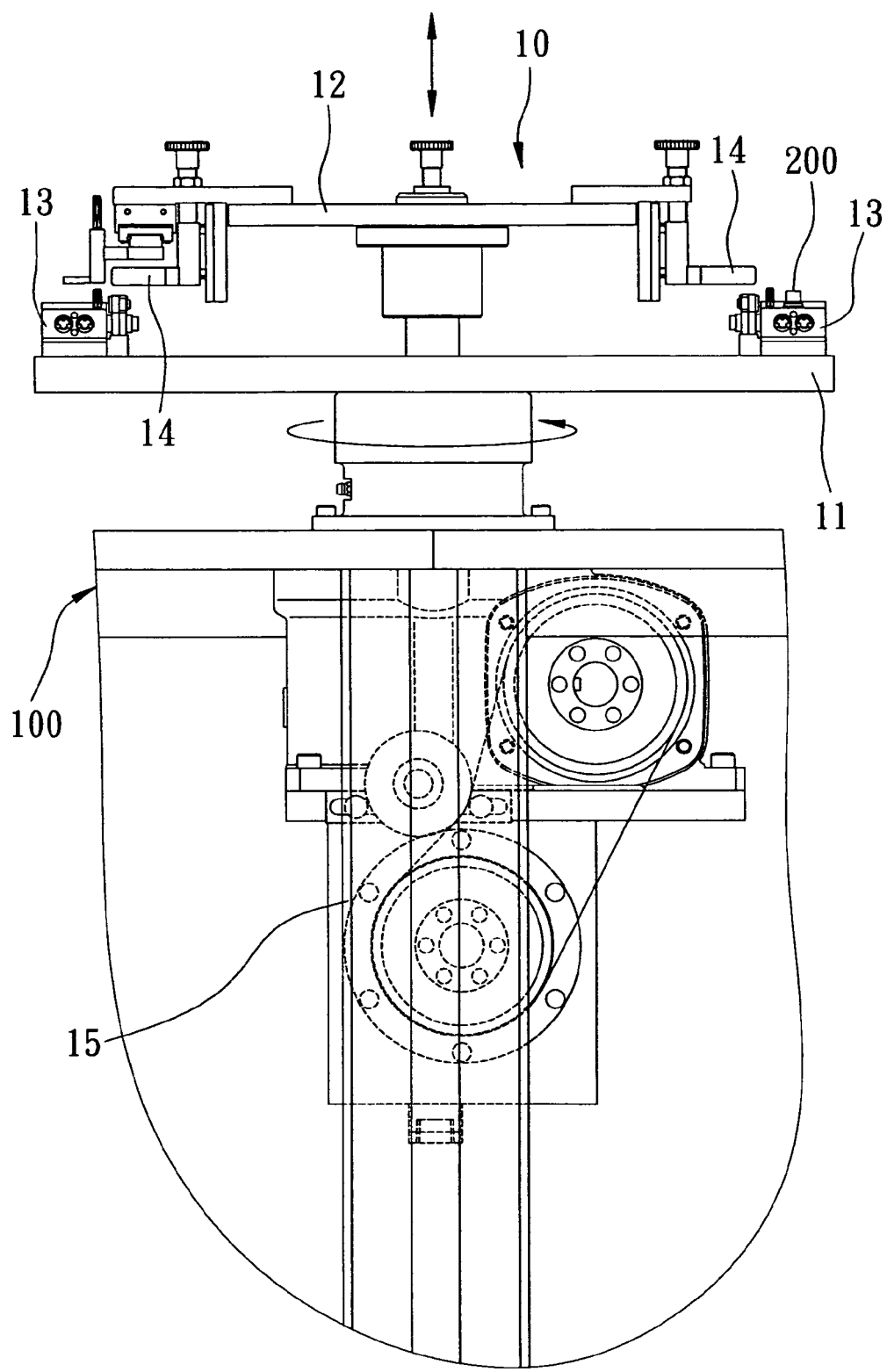
FIG. 5 is a schematic side view of a main workstation of the preferred embodiment.
Figure 6:
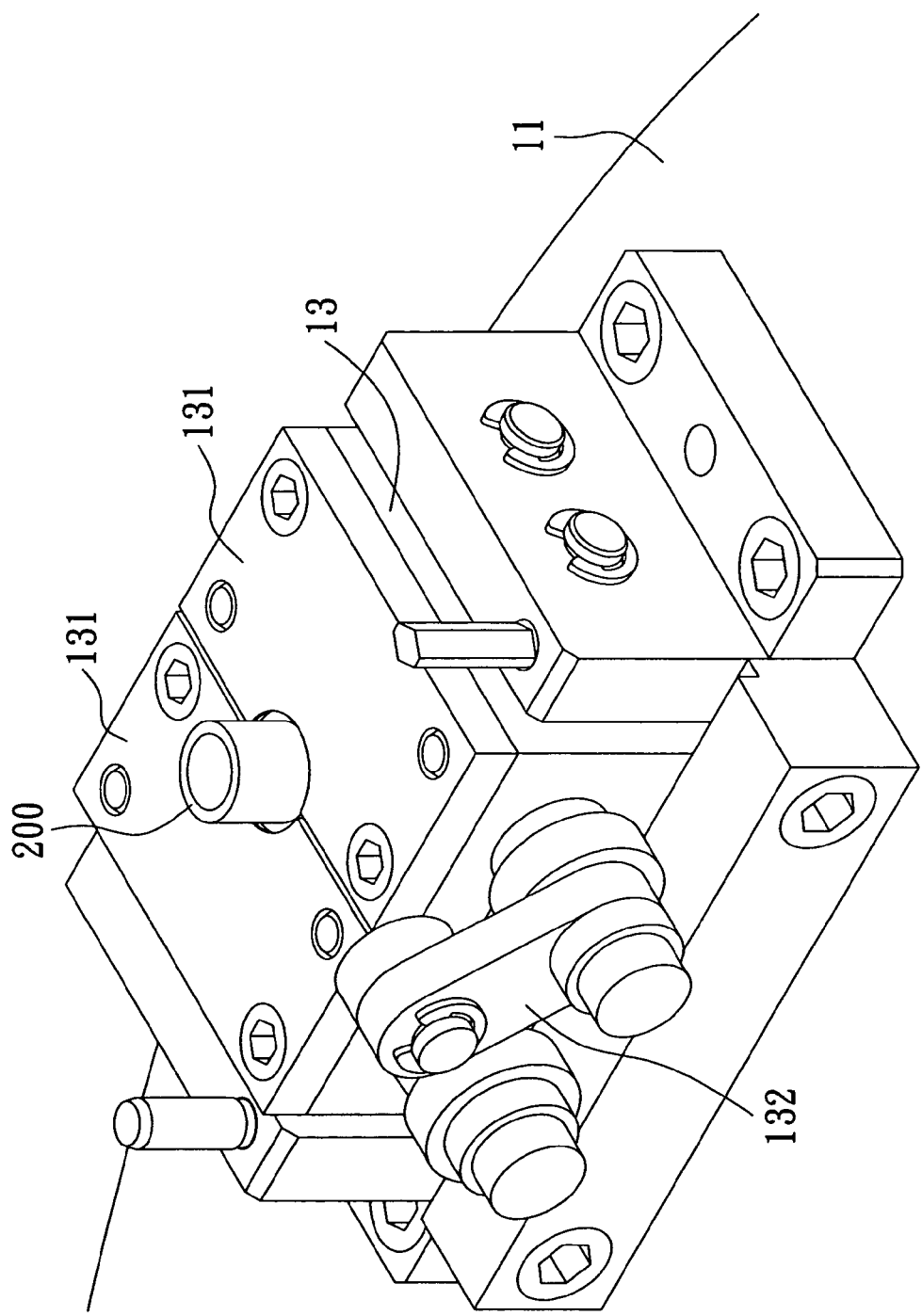
FIG. 6 is a schematic perspective view of a barrel-clamping unit of the main workstation of the preferred embodiment.
Figure 7:
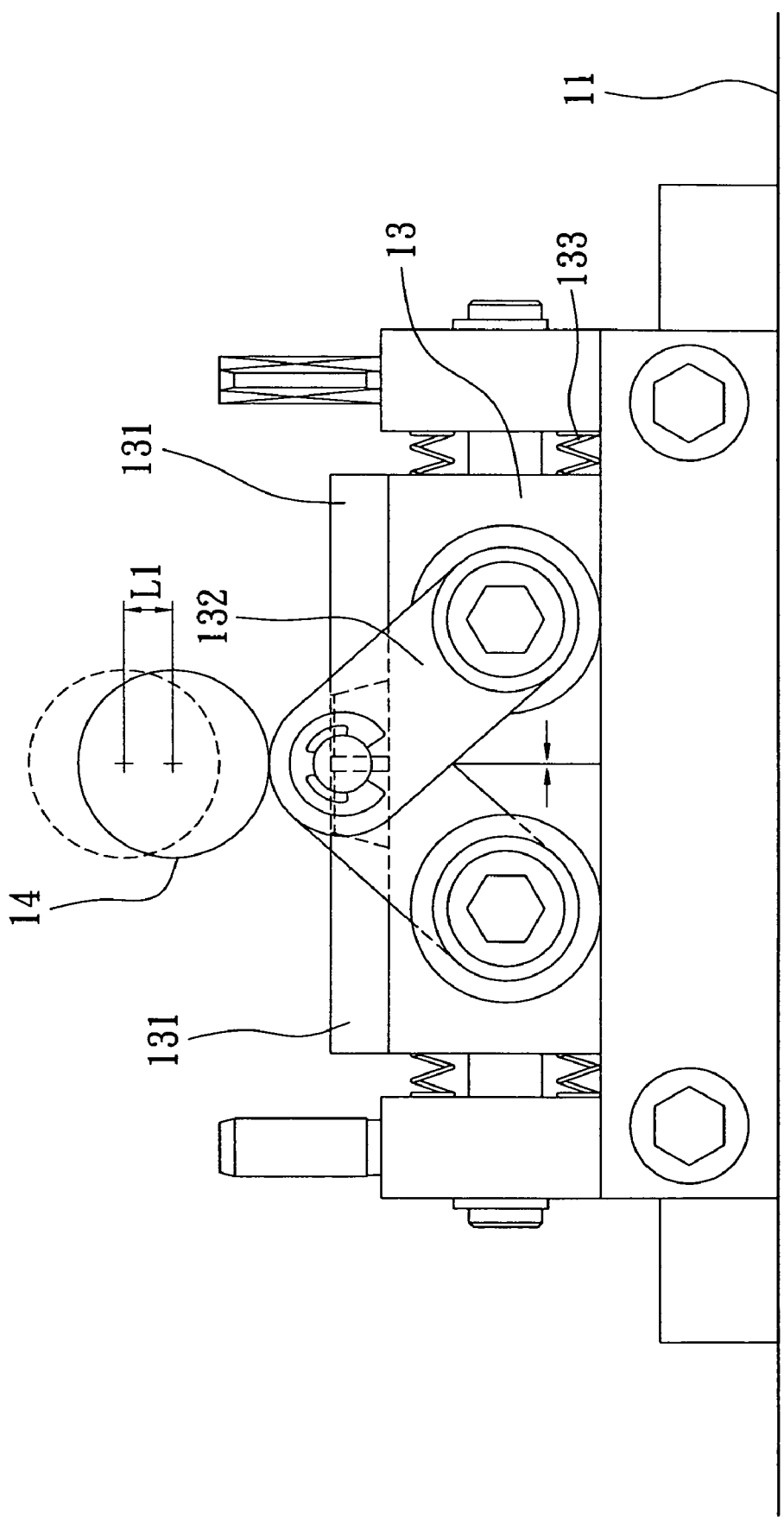
FIG. 7 is a schematic side view of the barrel-clamping unit of the preferred embodiment, illustrating how the barrel-clamping unit is in a barrel-clamping mode.
Figure 8:
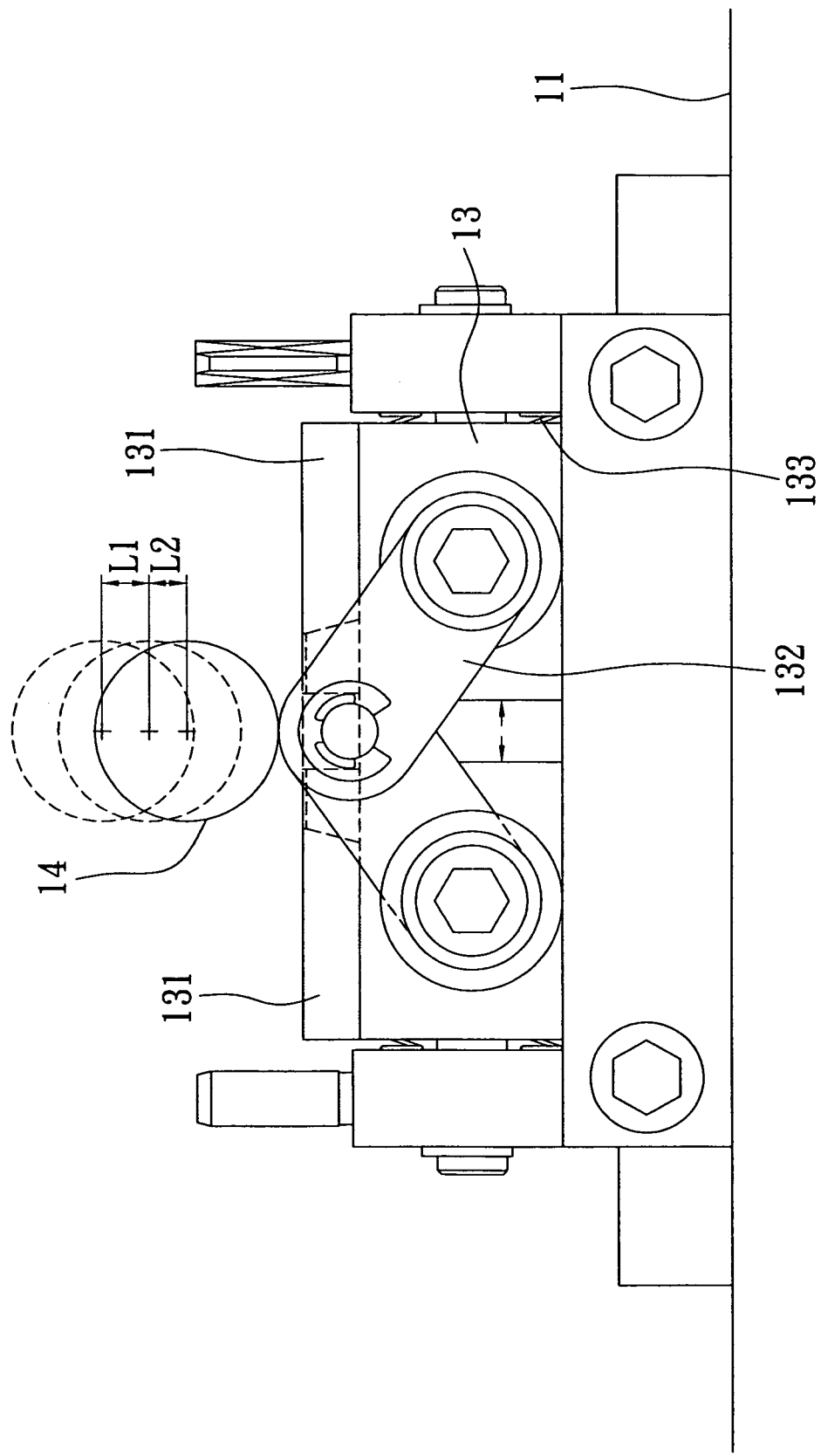
FIG. 8 is a schematic side view of the barrel-clamping unit of the preferred embodiment, illustrating how the barrel-clamping unit is in a barrel-releasing mode.
Figure 9:
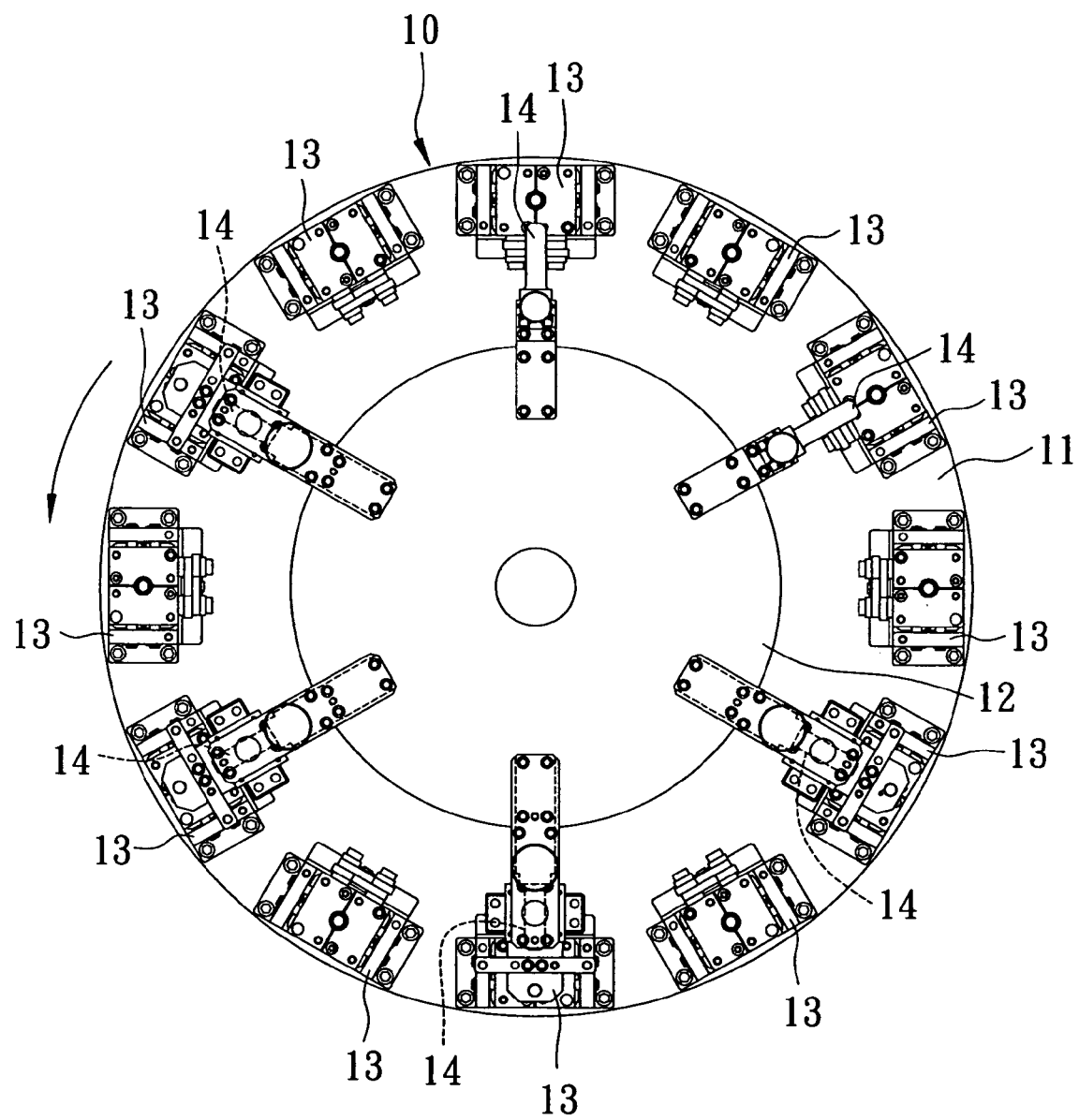
FIG. 9 is a schematic top view of the main workstation of the preferred embodiment.
Figure 10:
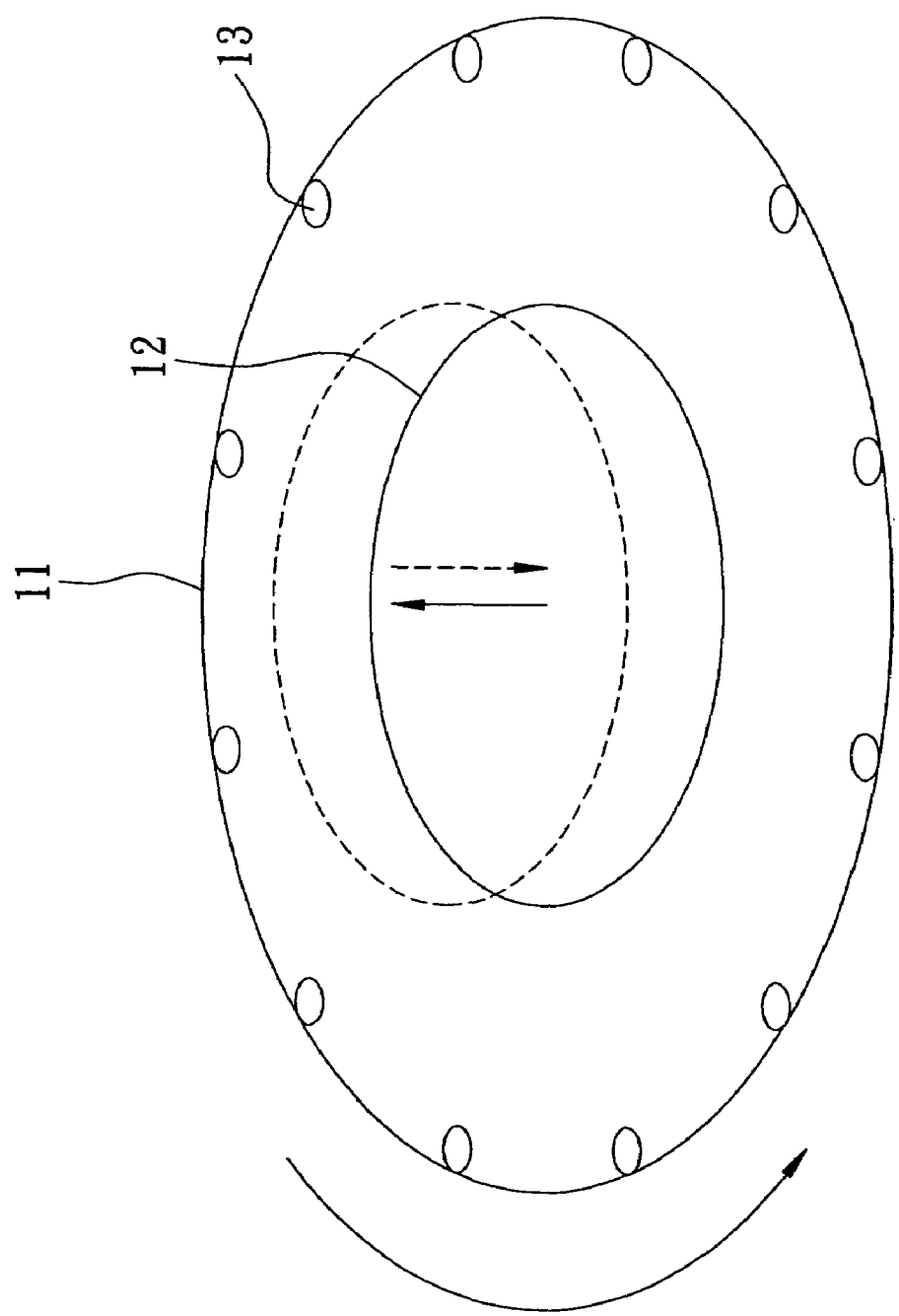
FIG. 10 is a schematic view illustrating operation of the main workstation of the preferred embodiment.
Figure 11:
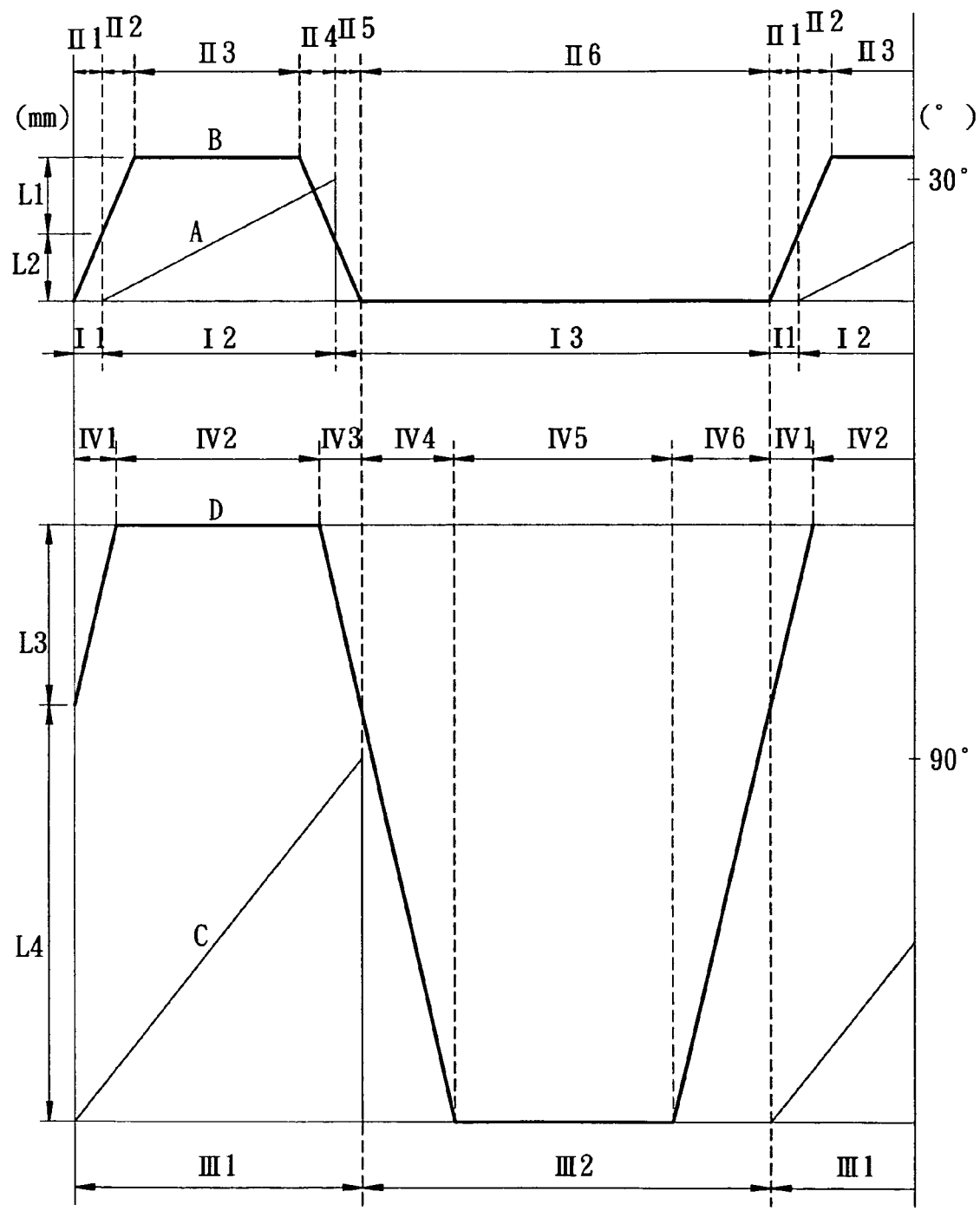
FIG. 11 is a time schedule diagram illustrating cooperation scheme of the barrel-clamping unit, a barrel-feeding station, a lens-feeding station, and a camera lens-removing station of the preferred embodiment.

Referring to FIGS. 5 and 9, the main workstation 10 is disposed on the machine bed 100, and includes a horizontal main disk 11, a cam wheel 12, twelve angularly equidistant barrel-clamping units 13 disposed on the main disk 11, six angularly equidistant pressing rods 14 disposed on the cam wheel 12, and a cam unit 15 driven by the power driven unit 60 (see FIG. 4) via a V-belt pulley unit. In this embodiment the cam unit 15 is a twelve-phase cam, model number 9ADS, made by Sankyo Seisakusho Co. Referring to FIGS. 6, 7, and 8, each of the barrel-clamping units 13 includes two clamping members 131 movable toward and away from each other, a toggle link unit 132 capable of being pressed to push the clamping members 131 away from each other, and a plurality of compression springs 133 for biasing the claming members 131 to move toward each other. In each of the barrel-clamping units 13, when the corresponding pressing rod 14 presses downwardly the toggle link unit 132, the toggle link unit 132 pushes the clamping members 131 away from each other, as shown in FIG. 8. When the corresponding pressing rod 14 is removed upwardly from the toggle link unit 132, the clamping members 131 are moved by the restoration force of the compression springs 133 to press against each other, as shown in FIG. 7. Referring to FIGS. 5, 10, 11, when the power driven unit 60 (see FIG. 4) drives the cam unit 15 so as to rotate the main disk 11 at a speed of 1/12 revolution per second, the barrel-clamping units 13 rotate cyclically and intermittently along the feeding direction (F) (see FIG. 33). The cam unit 15 drives the cam wheel 12 so as to move the pressing rods 14 vertically, intermittently, and cyclically (one cycle per second) between upper limit rod positions and lower limit rod positions. Each rotation cycle (I) of the main disk 11 includes a rest period (I 1), a 30°-rotation period (I 2), and a stop period (I 3). The main disk 11 is idle during the rest period (I 1) and the stop period (I 3), and is rotated counterclockwise by an angle of 30 degrees during the 30°-rotation period (I 2). Each movement cycle (II) of each of the pressing rods 14 includes a clamping period (II 1), a removing period (II 2), a high point-staying period (II 3), an approach period (II 4), a pressing-out period (II 5), and a lower-point staying period (II 6). The boundary between the approach period (II 4) and the pressing-out period (II 5) is at the starting time of the stop period (I 3). Operations of one of the barrel-clamping units 13 and a corresponding one of the pressing rods 14 will be described in the succeeding paragraph. In FIG. 11, a thin solid line (A) represents the rotational angle of the main disk 11, and a thick solid line (B) represents the vertical position of the pressing rod 14.

Referring to FIGS. 7 and 11, during the approach period (II 4), the pressing rod 11 moves downwardly from the high point-staying by a distance (L1) so as to contact the toggle link unit 132. Referring to FIGS. 8 and 11, during the pressing-out period (II 5), the pressing rod 11 continues to move downwardly by a distance (L2) so as to arrive at the lower limit rod position. As such, the toggle link unit 132 pushes the clamping members 131 away from each other. During the lower point-staying period (II 6), the pressing rod 14 is maintained at the lower limit rod position so as to allow for movement of the barrel 200 (see FIG. 6) into a space between the clamping members 131. The boundary between the clamping period (II 1) and the removing period (II 2) is at the starting time of the 30°-rotation period (I 2). Referring to FIGS. 7, 8, and 11, during the clamping period (II 1), the pressing rod 14 moves upwardly from the lower limit rod position by the distance (L2). As such, the compression springs 133 move and press the clamping members 131 against the barrel 200 (see FIG. 6). Referring to FIGS. 7 and 11, during the removing period (II 2), the pressing rod 14 continues to move upwardly by the distance (L1) so as to arrive at the upper limit rod position. During the high point-staying period (II 3), the pressing rod 14 is maintained at the upper limit rod position. Under automatic control, to promote the operation efficiency of the automatic assembling system, the pressing rod 14 moves upwardly from the lower limit rod position just before the main disk 11 rotates, and moves back to the lower limit rod position just after the main disk 11 rotates by an angle of 30 degrees, as shown in FIG. 11.

Referring to FIGS. 2 and 3, the above cyclical operations will cause each of the barrel-clamping units 13 to align with the barrel-feeding station 20, the lens-feeding stations (30A, 30B, 30C, 30D), the height-detecting unit 70, the camera lens-removing station 50, and the camera lens-detecting unit 80 in sequence. Each of the barrel-clamping units 13 can be converted into a barrel-clamping mode and a barrel-releasing mode when it is aligned with each of the barrel-feeding station 20, the lens-feeding stations (30A, 30B, 30C, 30D), and the camera lens-removing station 50.

Figure 12:
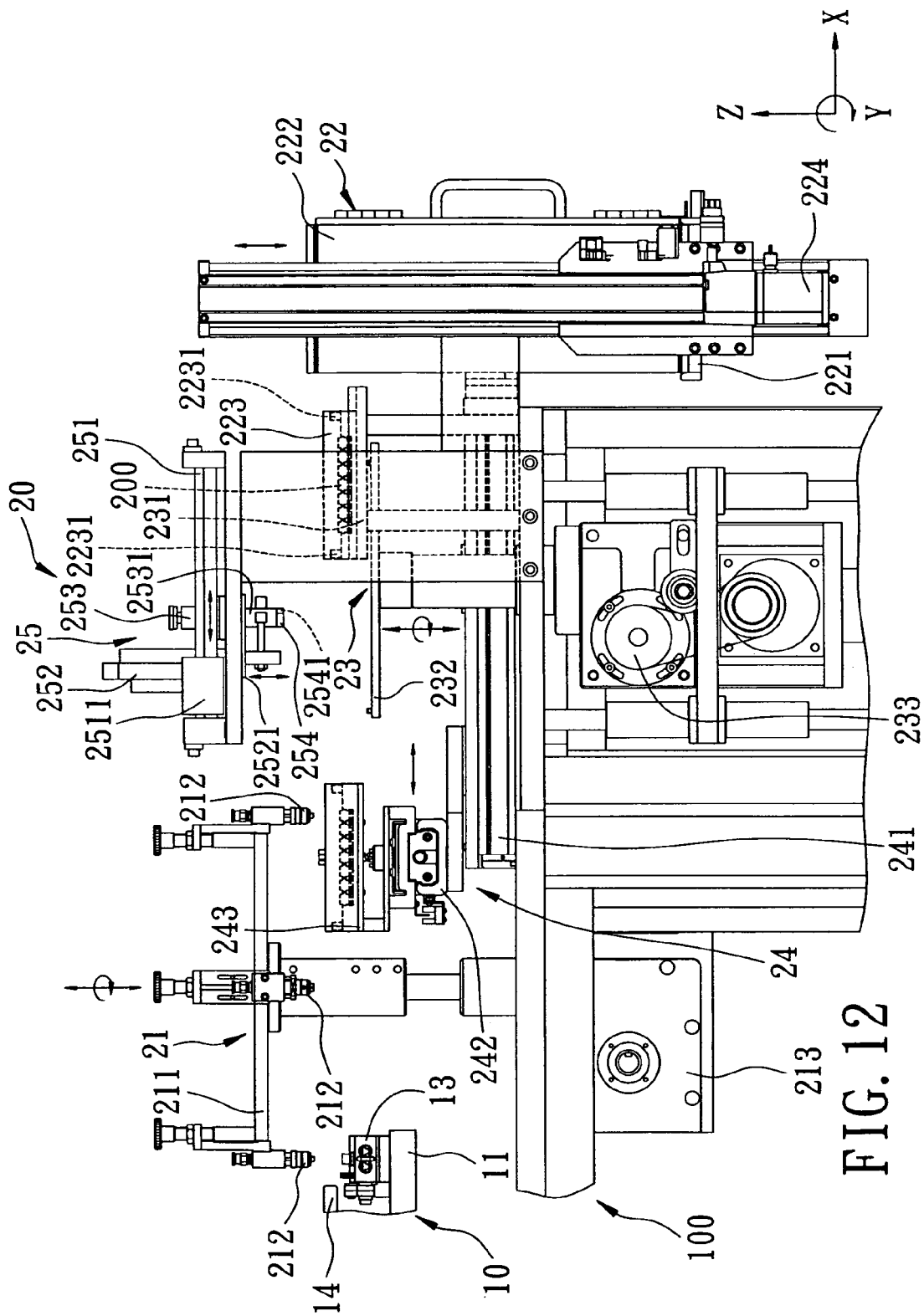
FIG. 12 is a schematic side view of a barrel-feeding station of the preferred embodiment.
Figure 13:
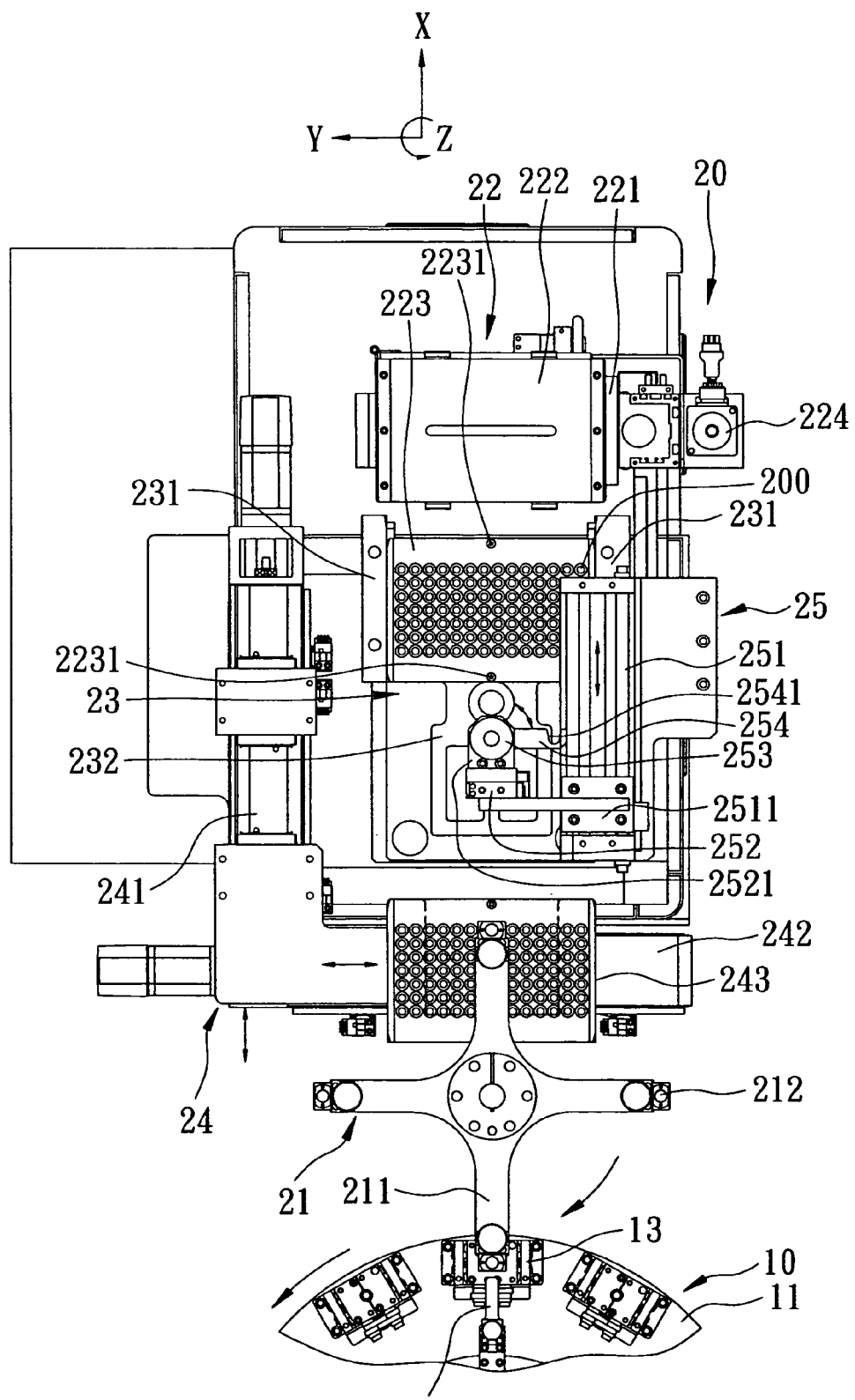
FIG. 13 is a schematic top view of the barrel-feeding station of the preferred embodiment.

Referring to FIGS. 12 and 13, the barrel-feeding station 20 is disposed on the machine bed 100, is adjacent to the main workstation 10, and includes a barrel-feeding device 21, a barrel storage unit 22, a temporary barrel-supporting unit 23, a barrel standby unit 24, and a barrel transportation unit 25.

The barrel-feeding device 21 includes a cam wheel 211, four angularly equidistant barrel holders 212 disposed on the cam wheel 211 and rotatable about a vertical axis, and a cam unit 213 driven by the power driven unit (60) (see FIG. 4) via a V-belt pulley unit. In this embodiment, the cam unit 213 is a four-phase cam, the model number 6FN, made by Sankyo Seisakusho Co.

Figure 14:
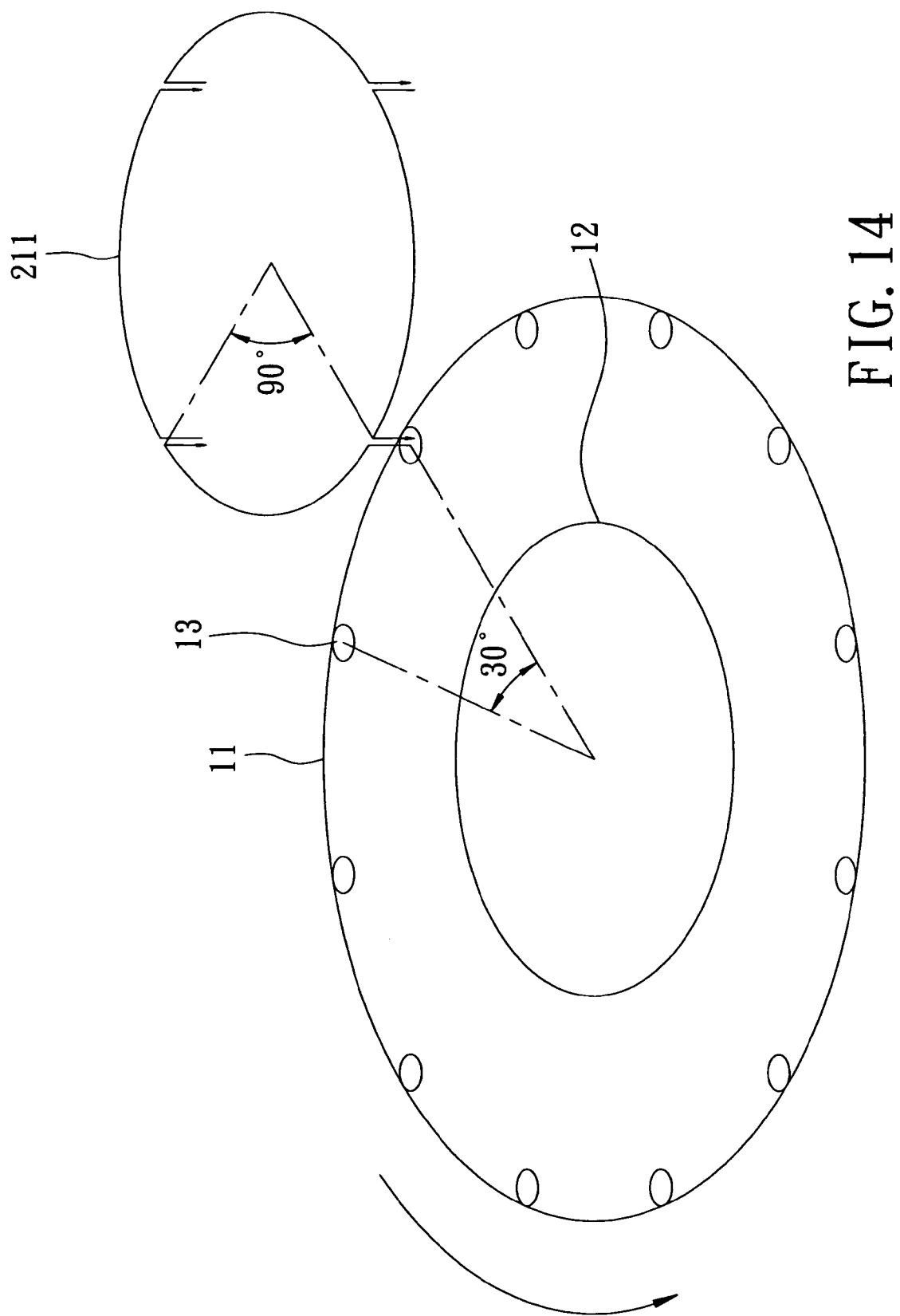
FIG. 14 is a schematic view illustrating cooperation between a barrel-feeding device of the barrel-feeding station and the main workstation.

Referring to FIGS. 11, 12, and 14, when the power driven unit (60) (see FIG. 4) drives the cam unit 213 so as to rotate the cam wheel 211 at a speed of ¼ revolution per second, the barrel holders 212 cooperate with the intermittent rotation of the barrel-clamping units 13 to rotate. The cam unit 213 drives the cam wheel 211 so as to move the barrel holders 212 intermittently and cyclically (one cycle per second) between upper limit holder positions and lower limit holder positions in cooperation with the intermittent movement of the pressing rods 14. Each rotation cycle (III) of the cam wheel 211 includes a 90°-rotation period (III 1), and a stop period (III 2). During the 90°-rotation period (III 1), the cam wheel 211 rotates the barrel holders 212 by an angle of 90 degrees. During the stop period (III 2), the cam wheel 211 is not rotated. Each movement cycle (IV) of each of the barrel holders 212 includes a removing period (IV 1), a high point period (IV 2), an approach period (IV 3), a descending period (IV 4), a lower point-staying period (IV 5), and an ascending period (IV 6). The cycles (I, II, III, IV) have the same starting time and the same ending time, as shown in FIG. 11. In FIG. 11, a thin solid line (C) represents the rotational angle of the cam wheel 211, and a thick solid line (D) represents the vertical position of the barrel holder 212. The boundary between the approach period (IV 3) and the descending period (IV 4) is at the starting time of the stop period (III 2). During the approach period (IV 3), the cam wheel 211 moves the barrel holder 212 downwardly from the upper limit holder position by a distance (L3) (see FIG. 11). During the descending period (IV 4), the cam wheel 211 continues to move the barrel holder 212 downwardly by a distance (L4) to the lower limit holder position. During the lower point-staying period (IV 5), the barrel holder 212 is maintained at the lower limit holder position. The boundary between the ascending period (IV 6) and the removing period (IV 1) is at the starting time of the 90°-rotation period (III 1). During the ascending period (IV 6), the cam wheel 211 moves the barrel holder 212 upwardly from the lower limit holder position by the distance (L4). During the removing period (IV 1), the cam wheel 211 continues to move the barrel holder 212 upwardly by the distance (L3) to the upper limit holder position. During the high point period (IV 2), the barrel holder 212 is maintained at the upper limit holder position.

Therefore, during the stop periods (I 3, III 2), the barrel holder 212 that is aligned with the barrel standby unit 24 performs the steps of downward movement, barrel-holding, and upward movement. On the other hand, the barrel holder 212 that is aligned with the barrel-clamping unit 13 performs the steps of downward movement, barrel-releasing, and upward movement.

The barrel storage unit 22 includes a bottom frame 221, a storage bin 222 for receiving a plurality of barrel-supporting trays 223 arranged one above another, and a power driven unit 224 for moving the storage bin 222 vertically along a first direction (Z). Each of the barrel-supporting trays 223 has front and rear ends that are provided respectively with two projections 2231 for dragging of the barrel transportation unit 25.

The temporary barrel-supporting unit 23 is disposed between the barrel storage unit 22 and the barrel standby unit 24 along a horizontal second direction (X) perpendicular to the first direction (Z), and includes a supporting frame 231, a cam wheel 232, and a cam unit 233. The cam unit 233 is a two-phase cam that drives the cam wheel 232 to move upwardly, rotate by an angle of 90°, and move downwardly.

The barrel standby unit 24 is disposed between the temporary barrel-supporting unit 23 and the barrel-feeding device 21 along the second direction (X), is located within a barrel standby area, and includes a lower sliding rail 241 extending along the second direction (X), an upper sliding rail 242 disposed above and movable horizontally on the lower sliding rail 241 along the second direction (X) and extending along a horizontal third direction (Y) perpendicular to the first and second directions (Y, X), and a barrel standby platform 243 movable horizontally on the upper sliding rail 242 along the third direction (Y).

Figure 15:
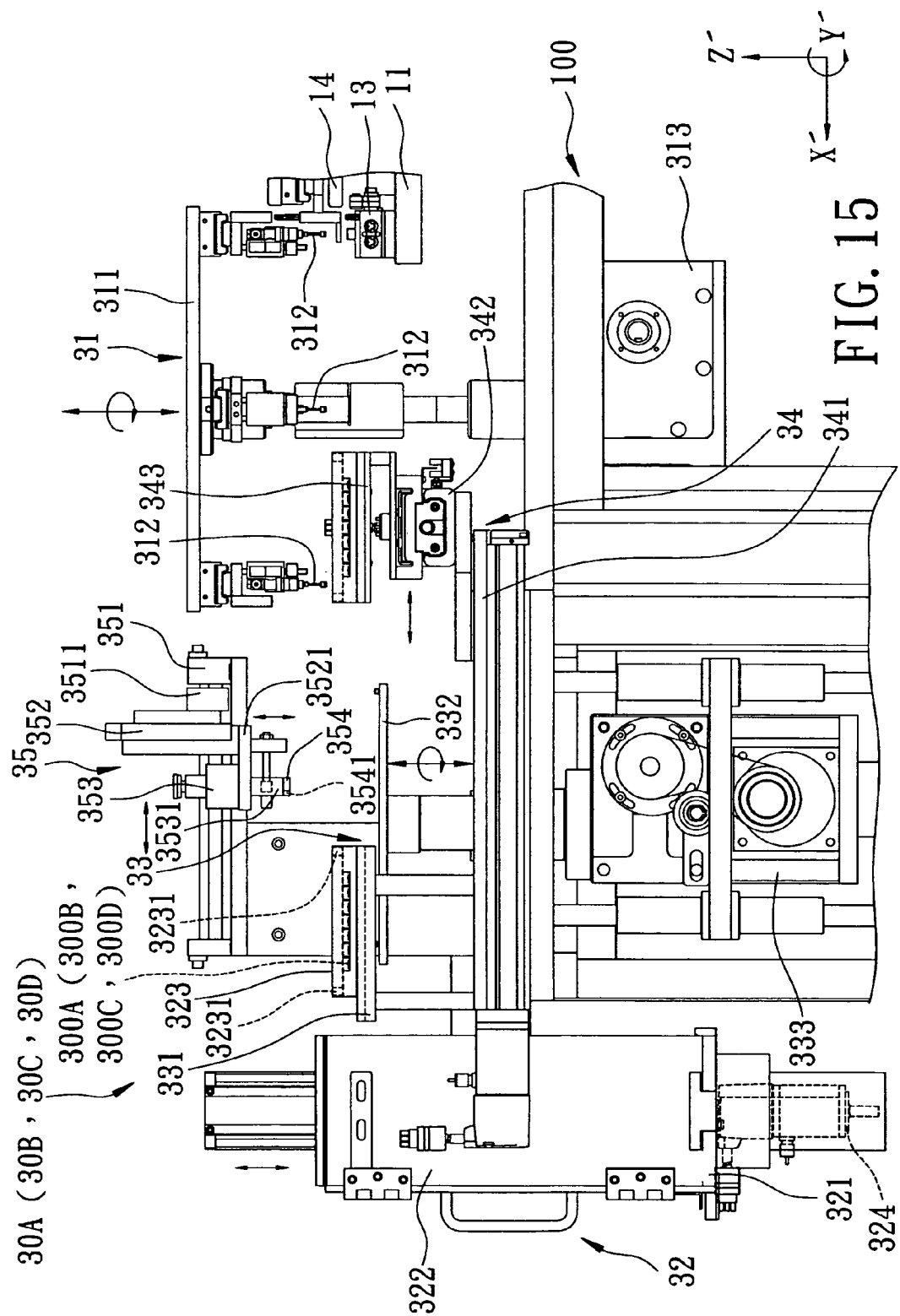
FIG. 15 is a schematic side view of a lens-feeding station of the preferred embodiment.
Figure 16:
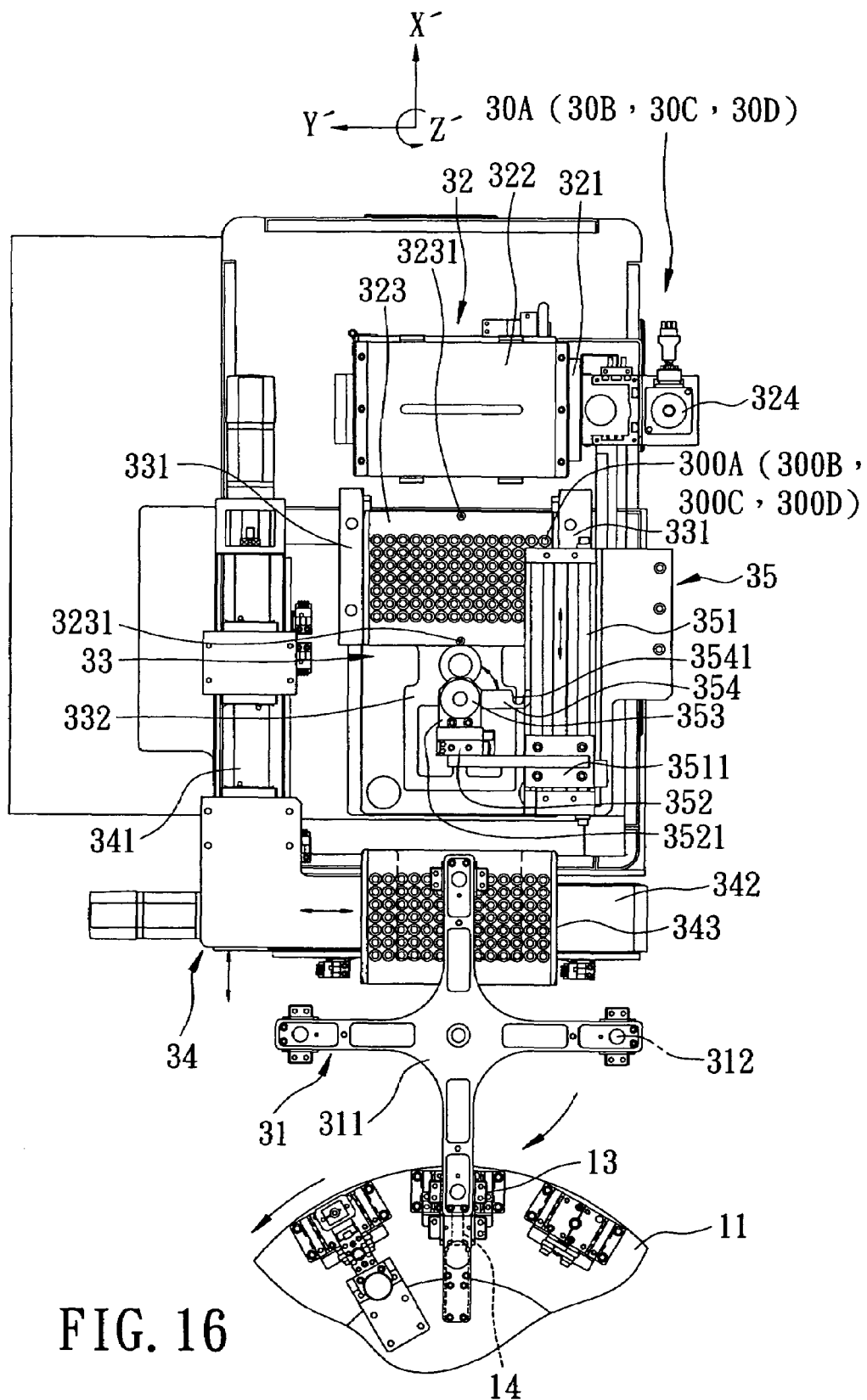
FIG. 16 is a schematic top view of the lens-feeding station of the preferred embodiment.

The barrel transportation unit 25 includes a horizontal rodless cylinder 251 extending along the second direction (X), a vertically movable cylinder 252 extending along the first direction (Z), a rotating cylinder 253, and a dragging hook 254. The rodless cylinder 251 includes a movable seat 2511 movable horizontally along the second direction (X). The vertically movable cylinder 252 is connected to the movable seat 2511, and includes a vertical piston rod (not shown), and a vertically movable seat 2521 connected fixedly to the bottom end of the piston rod (not shown) and movable vertically along the first direction (Z). The rotating cylinder 253 includes a vertical rotating shaft 2531 journalled on the vertically movable seat 2521. The dragging hook 254 is disposed on a bottom end of the rotating shaft 2531, and includes an engaging groove 2541 for engaging one of the projections 2231 of the barrel-supporting tray 223. Therefore, the dragging hook 254 of the barrel transportation unit 25 can reciprocate along the second direction (X) so as to move one of the barrel-supporting trays 223 from the storage bin 222 onto the supporting frame 231 of the temporary barrel-supporting unit 23. Thereafter, the one of the barrel-supporting trays 223 can be moved back to the storage bin 222 by the barrel transportation unit 25. Referring to FIGS. 2, 15, and 16, the lens-feeding stations (30A, 30B, 30C, 30D) are disposed on the machine bed 100, are adjacent to the main workstation 10, and are arranged along the feeding direction (F) (see FIG. 33). Any adjacent two of the lens-feeding stations (30A, 30B, 30C, 30D) are angularly spaced apart from each other at an angle of 60 degrees. Referring to FIGS. 2, 15, and 16, each of the lens-feeding stations (30A, 30B, 30C, 30D) includes a lens-feeding device 31, a lens storage unit 32, a temporary lens-supporting unit 33, a lens standby unit 34, and a lens transportation unit 35. Because the lens-feeding stations (30A, 30B, 30C, 30D) have the same structure, only one of the lens-feeding stations (30A, 30B, 30C, 30D) will be described in the succeeding paragraphs.

The lens-feeding device 31 includes a cam wheel 311, four angularly equidistant lens-sucking members 312 disposed on the cam wheel 311 and rotatable about a vertical axis, and a cam unit 313 driven by the power driven unit 60 (see FIG. 4) via a V-belt pulley unit. In this embodiment, the cam unit 313 is a four-phase cam, the model number 6FN, made by Sankyo Seisakusho Co. During the stop period (I 3, III 2), the lens-sucking member 312 that is aligned with the lens standby unit 34 performs the steps of downward movement, lens-sucking, and upward movement. On the other hand, the lens-sucking member 312 that is aligned with the barrel-clamping unit 13 performs the steps of downward movement, barrel-releasing, and upward movement so as to feed four stacked lenses (300A, 300B, 300C, 300D) (see FIGS. 33 and 34) respectively from the lens-feeding stations (30A, 30B, 30C, 30D) into each of the barrels 200 clamped on the barrel-clamping units 13 of the main workstation 10 to form a camera lens unit 400 (see FIGS. 17, 18, 33 and 34). The four stacked lenses (300A, 300B, 300C, 300D) in each of the barrels 200 constitute a lens assembly.

The lens storage unit 32 includes a bottom frame 321, a storage bin 322 for receiving a plurality of lens-supporting trays 323 arranged one above another, and a driving unit 324 for moving the bottom frame 321 and the storage bin 322 vertically along a first direction (Z'). Each of the lens-supporting trays 323 has front and rear ends that are provided respectively with two projections 3231 for dragging of the lens transportation unit 35.

The temporary lens-supporting unit 33 is disposed between the lens storage unit 32 and the lens standby unit 34 along a horizontal second direction (X') perpendicular to the first direction (Z'), and includes a cam wheel 332, and a cam unit 333. The cam unit 333 is a two-phase cam that drives the cam wheel 332 to move upwardly, rotate by an angle of 180°, and move upwardly.

The lens standby unit 34 is disposed between the temporary lens-supporting unit 33 and the lens-feeding device 31 along the second direction (X'), is located within a lens standby area, and includes a lower sliding rail 341 extending along the second direction (X'), an upper sliding rail 342 disposed above and movable horizontally on the lower sliding rail 341 along the second direction (X') and extending along a horizontal third direction (Y') perpendicular to the first and second directions (Z', X'), and a lens standby platform 343 movable horizontally on the upper sliding rail 342 along the third direction (Y').

The lens transportation unit 35 is similar to the barrel transportation unit 25 in construction, and includes a horizontal rodless cylinder 351 extending along the second direction (X'), a vertically movable cylinder 352 extending along the first direction (Z'), a rotating cylinder 353, and a dragging hook 354. The rodless cylinder 351 includes a movable seat 3511 movable horizontally along the second direction (X'). The vertically movable cylinder 352 is connected to the movable seat 3511, and includes a vertical piston rod (not shown), and a vertically movable seat 3521 connected fixedly to the bottom end of the piston rod (not shown) and movable vertically along the first direction (Z'). The rotating cylinder 353 includes a vertical rotating shaft 3531 journalled on the vertically movable seat 3521. The dragging hook 354 is disposed on a bottom end of the rotating shaft 3531, and includes an engaging groove 3541 for engaging one of the projections 3231 of the lens-supporting tray 323. Therefore, the dragging hook 354 of the lens transportation unit 35 can reciprocate along the second direction (X') so as to move one of the lens-supporting trays 323 from the storage bin 322 onto the supporting frame 331 of the temporary lens-supporting unit 33. Thereafter, the one of the lens-supporting trays 323 can be moved back to the storage bin 322 by the lens transportation unit 35.

Figure 17:
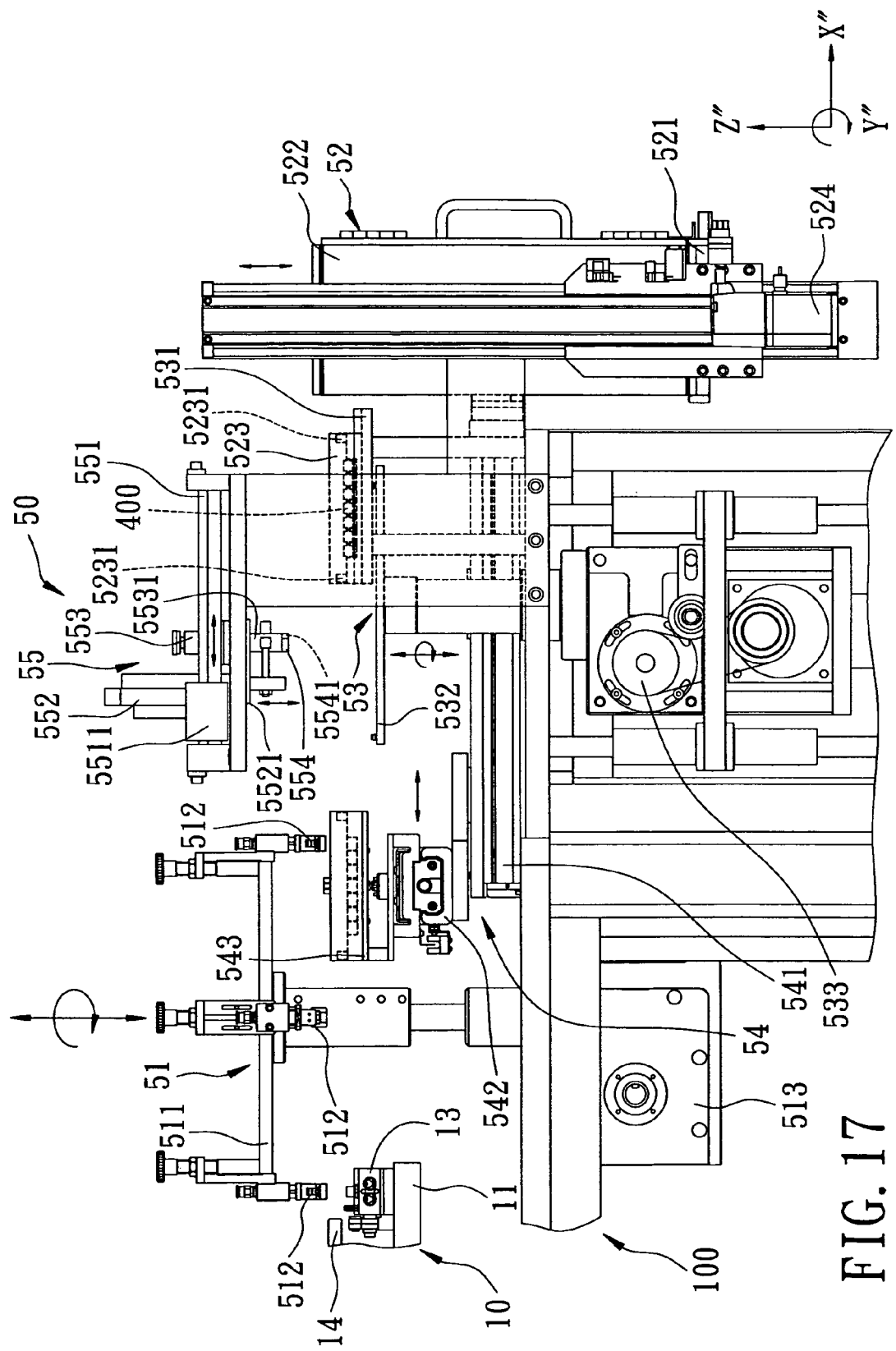
FIG. 17 is a schematic side view of a camera lens-removing station of the preferred embodiment.
Figure 18:
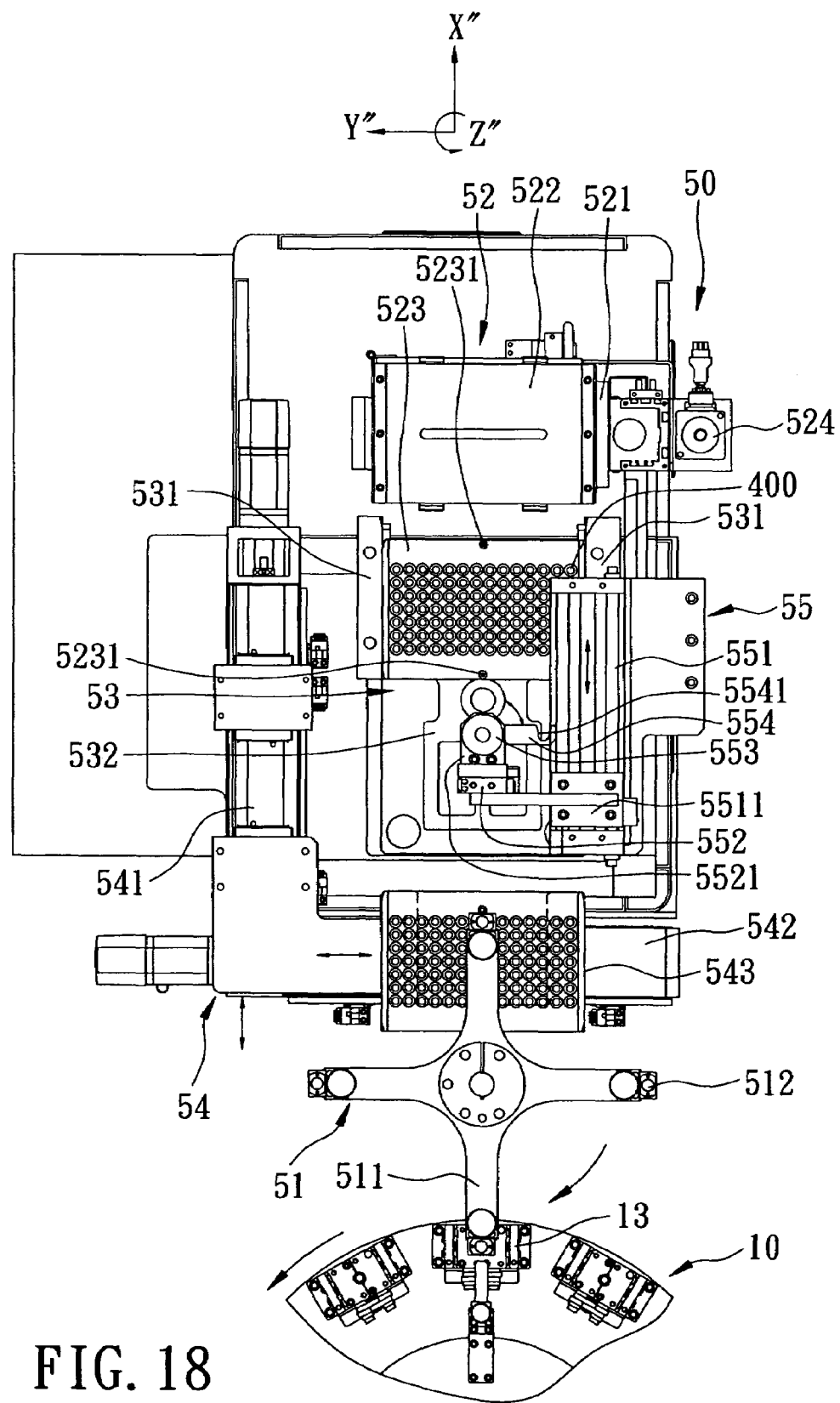
FIG. 18 is a schematic top view of the camera lens-removing station of the preferred embodiment.

Referring to FIGS. 17 and 18, the camera lens-removing station 50 is disposed on the machine bed 100, is adjacent to the main workstation 10, and includes a camera lens-removing device 51, a camera lens storage unit 52, a temporary camera lens-supporting unit 53, a camera lens-accepting unit 54, and a camera lens transportation unit 55.

The camera lens-removing device 51 includes a cam wheel 511, four angularly equidistant barrel holders 512 disposed on the cam wheel 511 and rotatable about a vertical axis, and a cam unit 513 driven by the power driven unit 60 (see FIG. 4) via a V-belt pulley unit. In this embodiment, the cam unit 513 is a four-phase cam, the model number 6FN, made by Sankyo Seisakusho Co. The operation of the camera lens-removing device 51 is similar to that of the barrel-feeding device 21. During the stop period (I 3, III 2), the barrel holder 512 that is aligned with the camera lens-accepting unit 54 performs the steps of downward movement, barrel-releasing, and upward movement. On the other hand, the barrel holder 512 that is aligned with the barrel-clamping unit 13 performs the steps of downward movement, barrel-holding, and upward movement.

The camera lens storage unit 52 includes a bottom frame 521, a storage bin 522 for receiving a plurality of camera lens-supporting trays 523 arranged one above another, and a driving unit 524 for moving the bottom frame 521 and the storage bin 522 vertically along a first direction (Z"). Each of the camera lens-supporting trays 523 has front and rear ends that are provided respectively with two projections 5231 for dragging of the camera lens transportation unit 55.

The temporary camera lens-supporting unit 53 is disposed between the camera lens storage unit 52 and the camera lens-accepting unit 54 along a horizontal second direction (X") perpendicular to the first direction (Z"), and includes a supporting frame 531, a cam wheel 532, and a cam unit 533. The cam unit 533 is a two-phase cam that drives the cam wheel 532 to move upwardly, rotate by an angle of 180°, and move downwardly.

The camera lens-accepting unit 54 is disposed between the temporary camera lens-supporting unit 53 and the camera lens-removing device 51 along the second direction (X"), is located within a camera lens-collecting area, and includes a lower sliding rail 541 extending along the second direction (X"), an upper sliding rail 542 disposed above and movable horizontally on the lower sliding rail 541 along the second direction (X") and extending along a horizontal third direction (Y") perpendicular to the first and second directions (Z", X"), and an accepting platform 543 movable horizontally on the upper sliding rail 542 along the third direction (Y").

The camera lens transportation unit 55 is also similar to the barrel transportation unit 25 in construction, and includes a horizontal rodless cylinder 551 extending along the second direction (X"), a vertically movable cylinder 552 extending along the first direction (Z"), a rotating cylinder 553, and a dragging hook 554. The rodless cylinder 551 includes a movable seat 5511 movable horizontally along the second direction (X"). The vertically movable cylinder 552 is connected to the movable seat 5511, and includes a vertical piston rod (not shown), and a vertically movable seat 5521 connected fixedly to the bottom end of the piston rod (not shown) and movable vertically along the first direction (Z"). The rotating cylinder 553 includes a vertical rotating shaft 5531 journalled on the vertically movable seat 5521. The dragging hook 554 is disposed on a bottom end of the rotating shaft 5531, and includes an engaging groove 5541 for engaging one of the projections 5231 of the camera lens-supporting tray 523. Therefore, the dragging hook 554 of the camera lens transportation unit 55 can reciprocate along the second direction (X") so as to move one of the camera lens-supporting trays 523 from the storage bin 522 onto the supporting frame 531 of the temporary camera lens-supporting unit 53. Thereafter, the one of the camera lens-supporting trays 523 can be moved back to the storage bin 522 by the camera lens transportation unit 55.

Referring to FIGS. 2 and 4, the power driven unit 60 can drive the cam unit 15 of the main workstation 10, the cam unit 213 of the barrel-feeding device 21 of the barrel-feeding station 20, and the cam units 313 of the lens-feeding devices 31 of the lens-feeding stations (30A, 30B, 30C, 30D). This enables the barrel holders 212 of the barrel-feeding device 21, the lens-sucking members 312 of the lens-feeding device 31, and the barrel holders 512 of the camera lens-removing device 51 to cooperate with the intermittent rotations of the barrel-clamping units 13 to perform intermittent operations.

Figure 34:
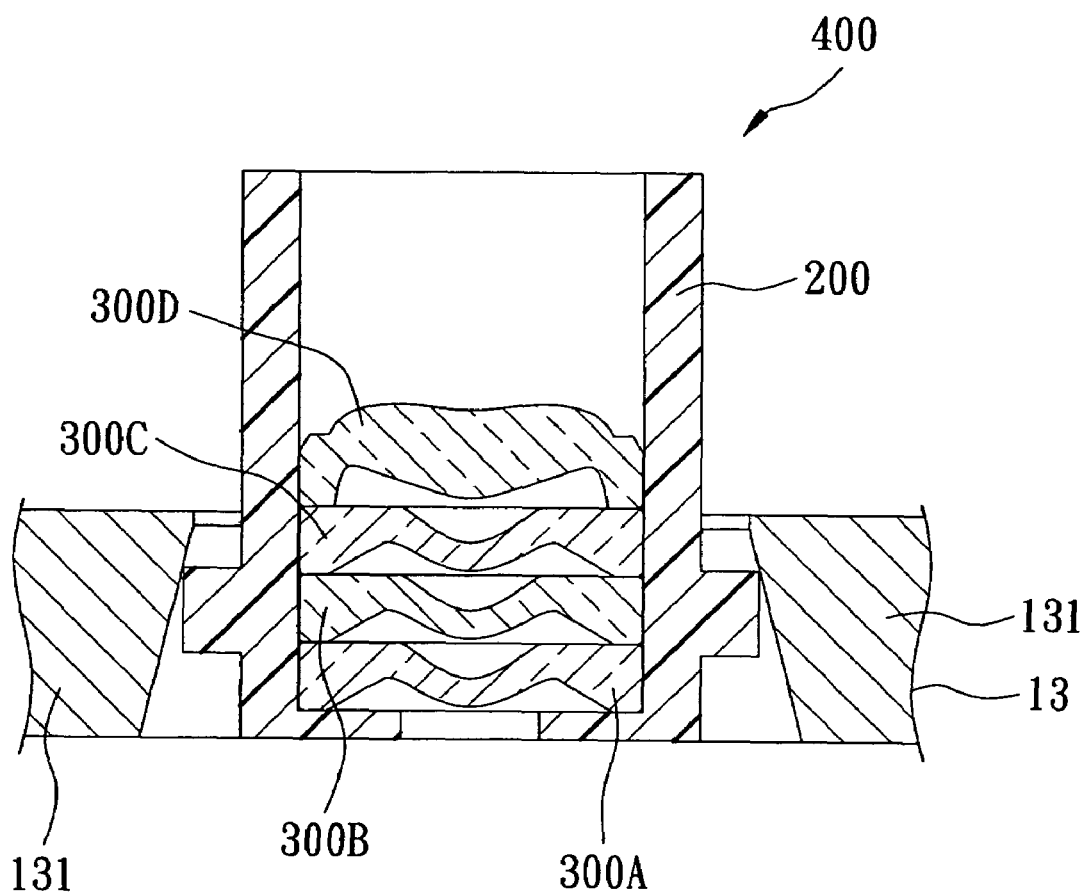
FIG. 34 is a schematic side view of the camera lens unit clamped on the barrel-clamping unit of the main workstation of the preferred embodiment.
Figure 35:
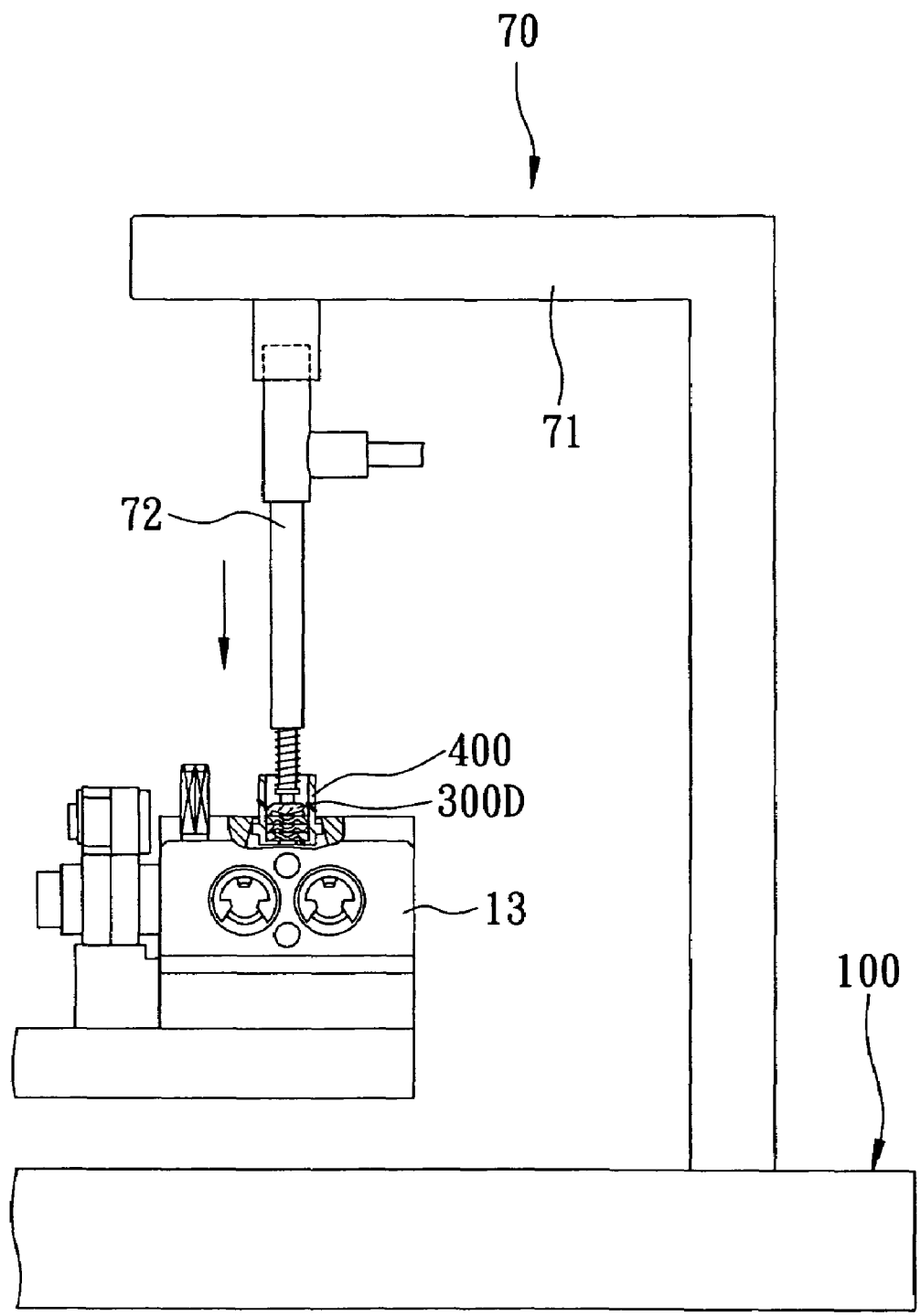
FIG. 35 is a schematic side view illustrating how a height-detecting unit detects the total height of the lenses within the barrel clamped on the barrel-clamping unit of the main workstation.

Referring to FIGS. 2 and 35, the height-detecting unit 70 is disposed between the last lens-feeding station (30D) and the camera lens-removing station 50 along the feeding direction (F) (see FIG. 33), and includes a mounting seat 71 disposed on the machine bed 100, and a gauge 72, such as a Sony DG810 digital gauge. When one of the camera lens units 400 (see FIGS. 33 and 34) is carried by one of the barrel-clamping units 13 to pass by the height-detecting unit 70, the gauge 72 can detect the total height of the stacked lenses (300A, 300B, 300C, 300D) (see FIGS. 33 and 34) in the one of the camera lens units 400 (see FIGS. 33 and 34).

Figure 40:
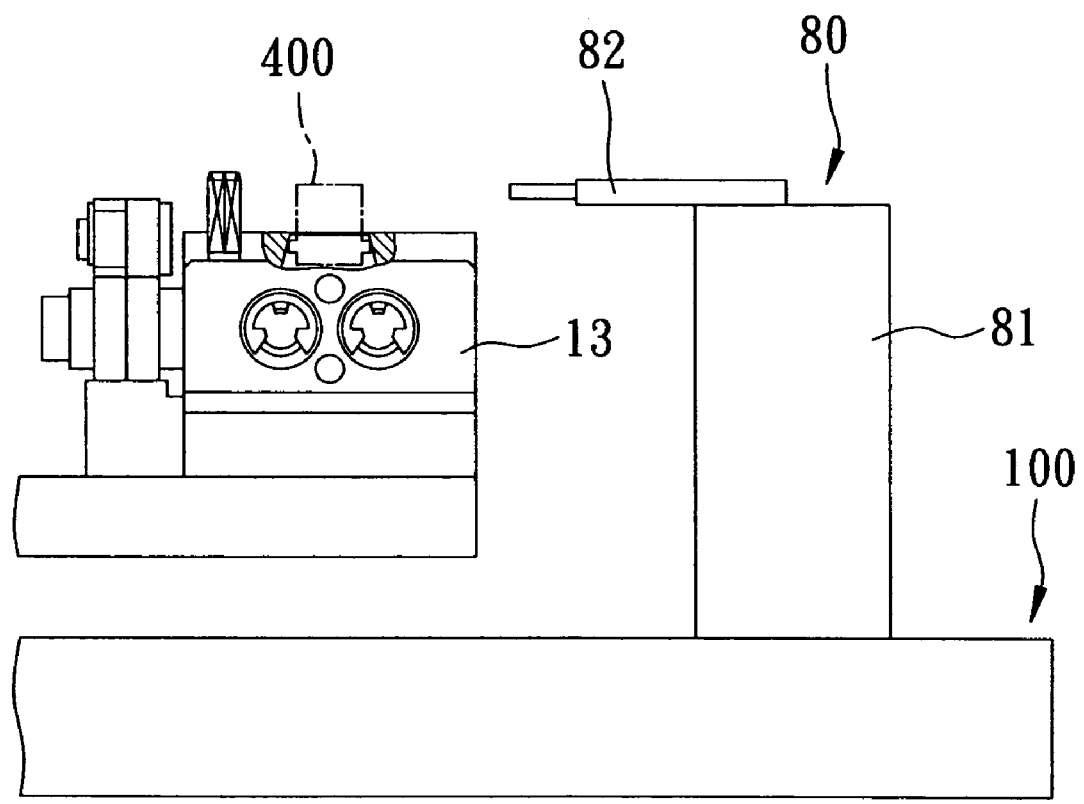
FIG. 40 is a schematic side view illustrating how a camera lens-detecting unit detects the presence of the camera lens unit on the barrel-clamping unit of the main workstation.

Referring to FIGS. 2 and 40, the camera lens-detecting unit 80 is disposed between said camera lens-removing station 50 and the barrel-feeding station 20 along the feeding direction (F) (see FIG. 33), and includes a mounting seat 81 disposed on the machine bed 100, and a reflection type optical fiber 82 disposed on the mounting seat 81 for checking whether or not any of the camera lens units 400 (see FIG. 33) has not yet been removed from the corresponding barrel-clamping unit 13 that is aligned with the camera lens-detecting unit 80.

Figure 33:
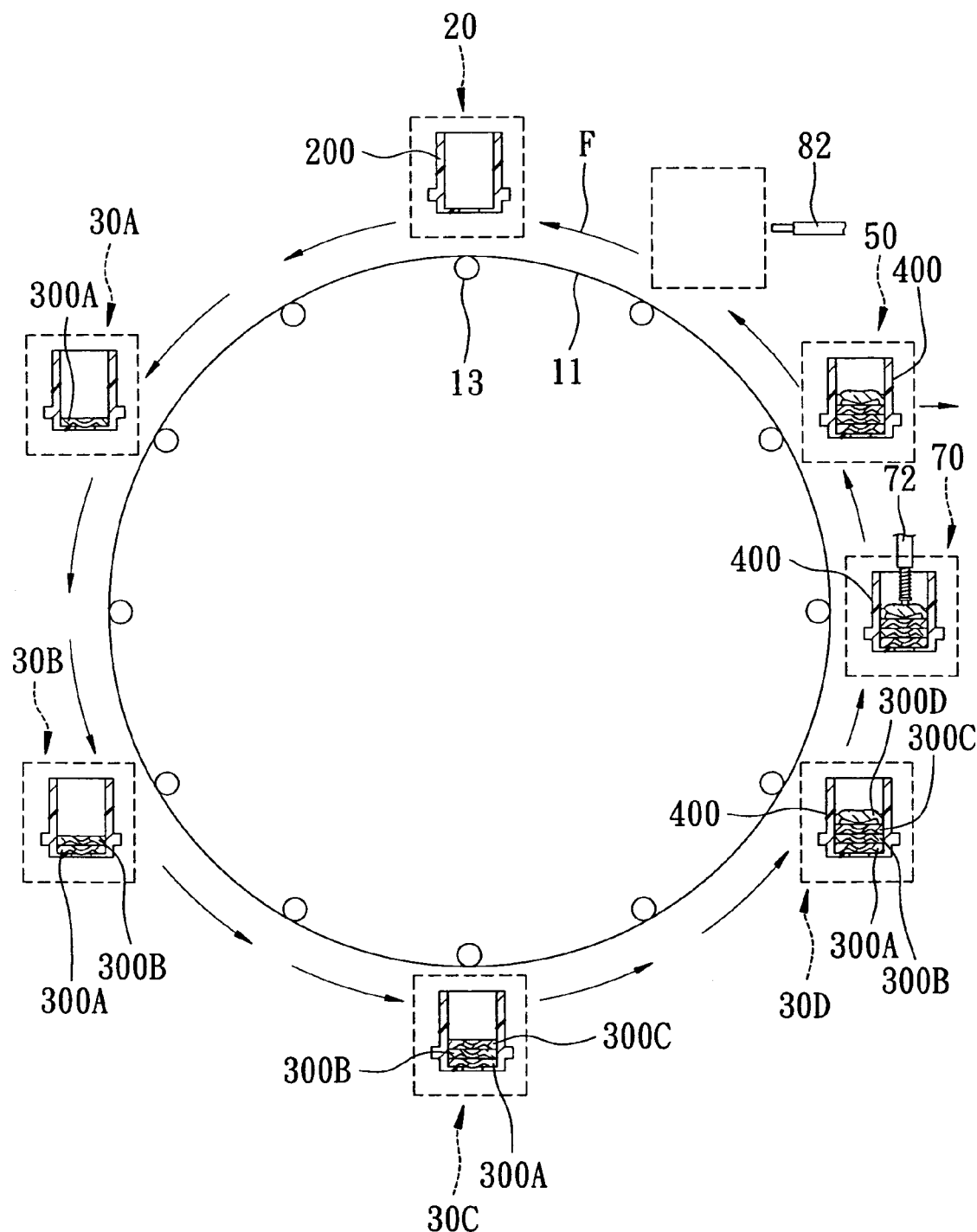
FIG. 33 is a schematic view illustrating an automatic assembling method for the camera lens units according to this invention.

Referring to FIG. 33, an automatic assembling method for the camera lens units 400 includes the steps of:

(A) rotating the barrel-clamping units 13 intermittently and cyclically along the feeding direction (F);

(B) cooperating with the intermittent rotations of the barrel-clamping units 13 to move the barrels 200 from the barrel standby area onto the barrel-clamping units 13 in sequence;

(C) cooperating with the intermittent rotations of the barrel-clamping units 13 to move the lenses (300A, 300B, 300C, 300D) respectively from the lens standby areas of the lens-feeding stations (30A, 30B, 30C, 30D) into the barrels 200 clamped on the barrel-clamping units 13 in sequence to form the camera lens units 400; and (D) cooperating with the intermittent rotations of the barrel-clamping units 13 to move the camera lens units 400 respectively and sequentially from the barrel-clamping units 13 into the accepting platform 543 disposed within the camera lens-collecting area in sequence.

In the step (A), referring to FIGS. 5, 10, 11, when the power driven unit 60 (see FIG. 4) drives the cam unit 15, the cam unit 15 rotates the main disk 11 at a speed of 1/12 revolution per second so as to rotate the barrel-clamping units 13 intermittently and cyclically along the feeding direction (F) (see FIG. 33). On the other hand, the cam wheel 12 moves the pressing rods 14 intermittently and cyclically (one cycle per second) between the upper and lower limit rod positions.

Figure 19:
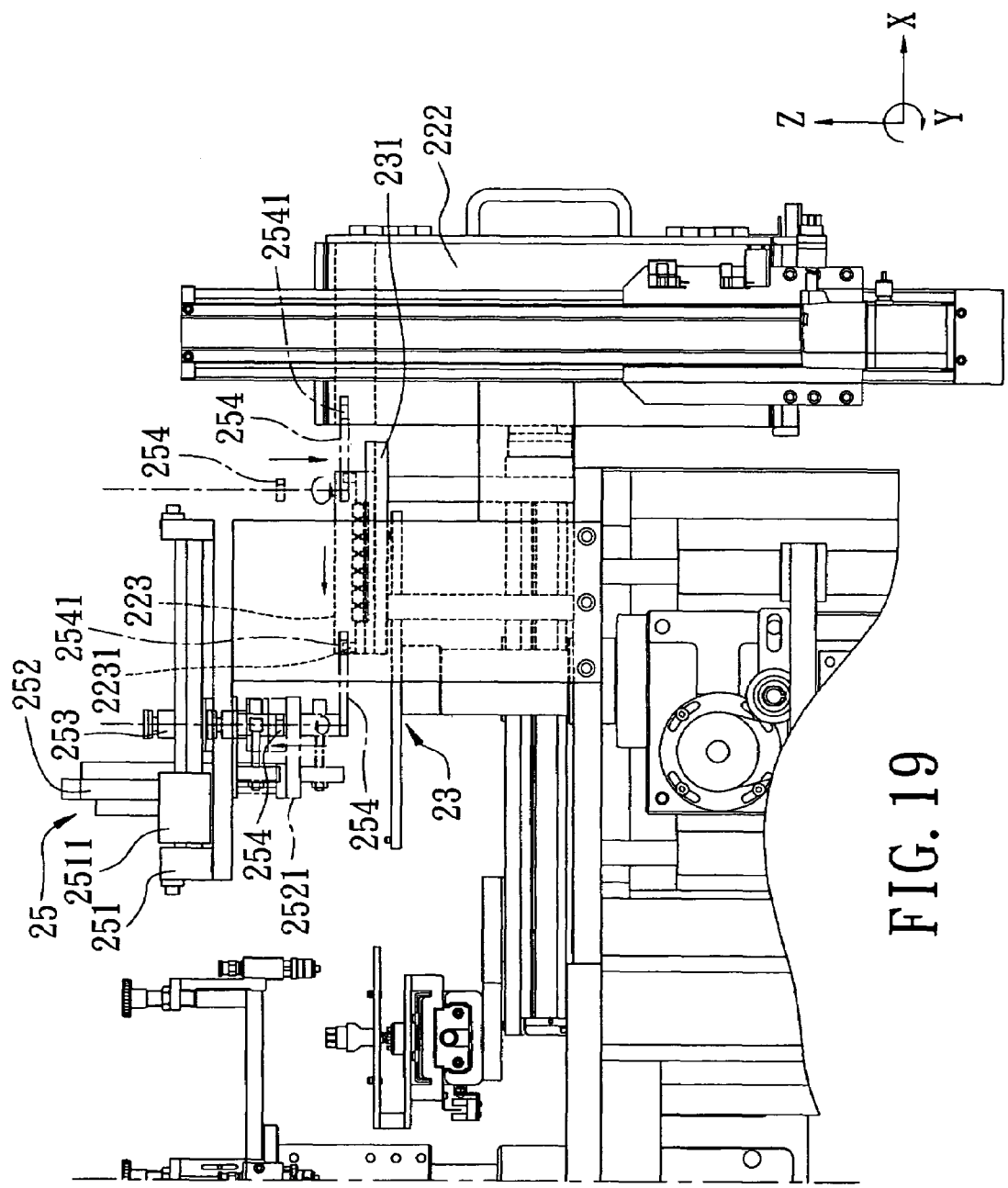
FIGS. 19, 20, 21, and 22 are schematic views of the barrel-feeding station of the preferred embodiment, illustrating how a barrel-supporting tray is moved from a barrel storage unit onto a barrel standby unit.
Figure 20:
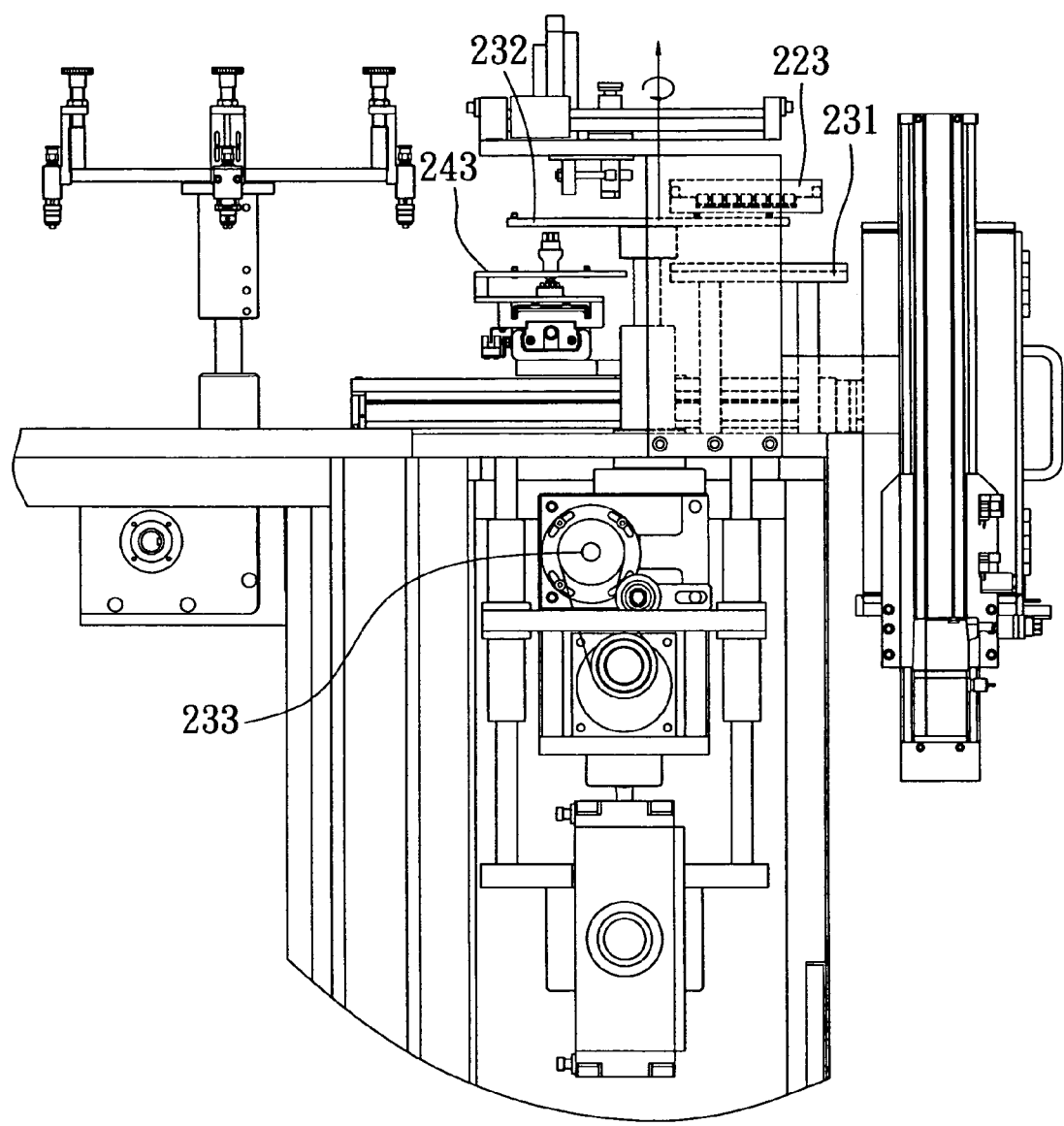
Figure 21:
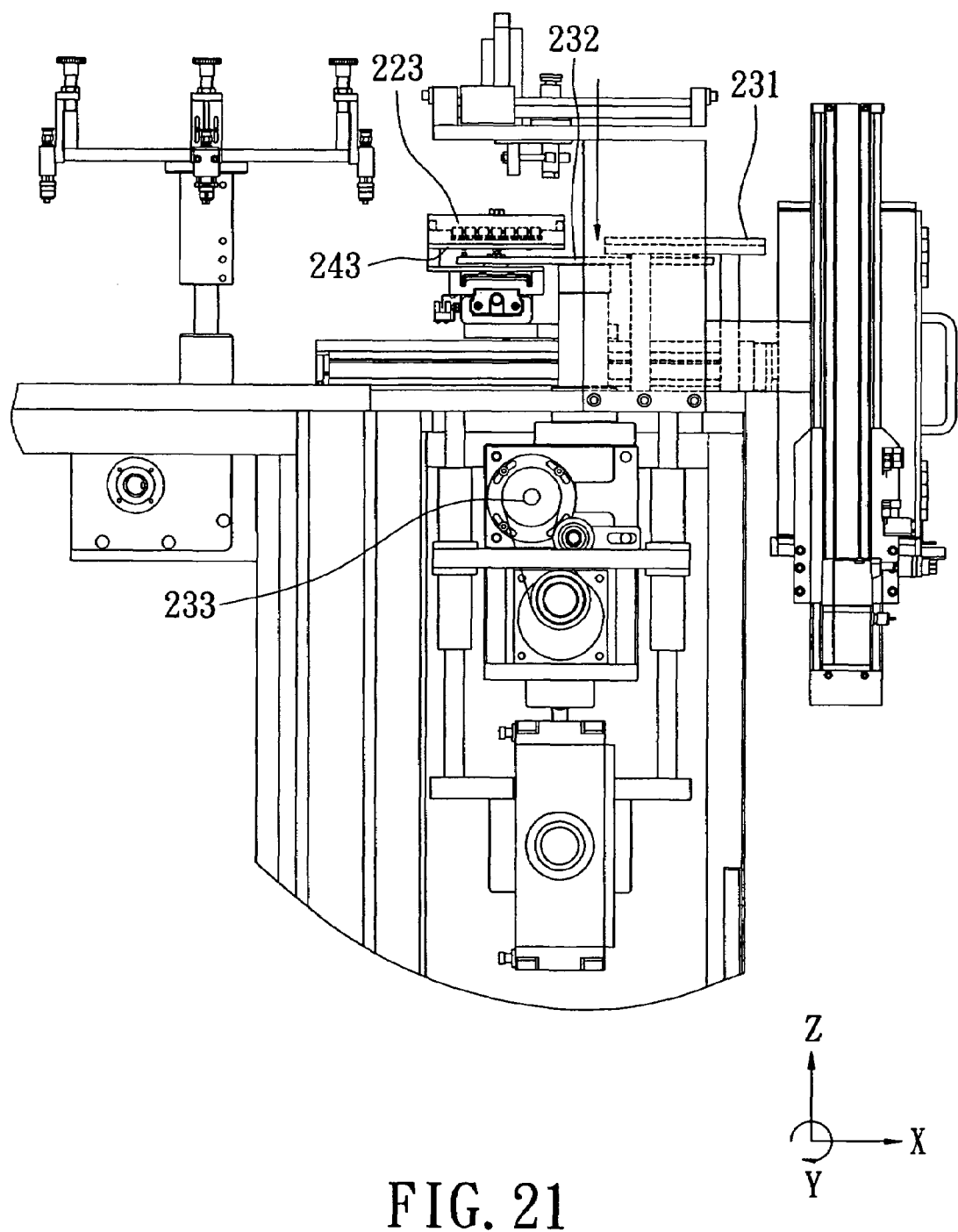
Figure 22:
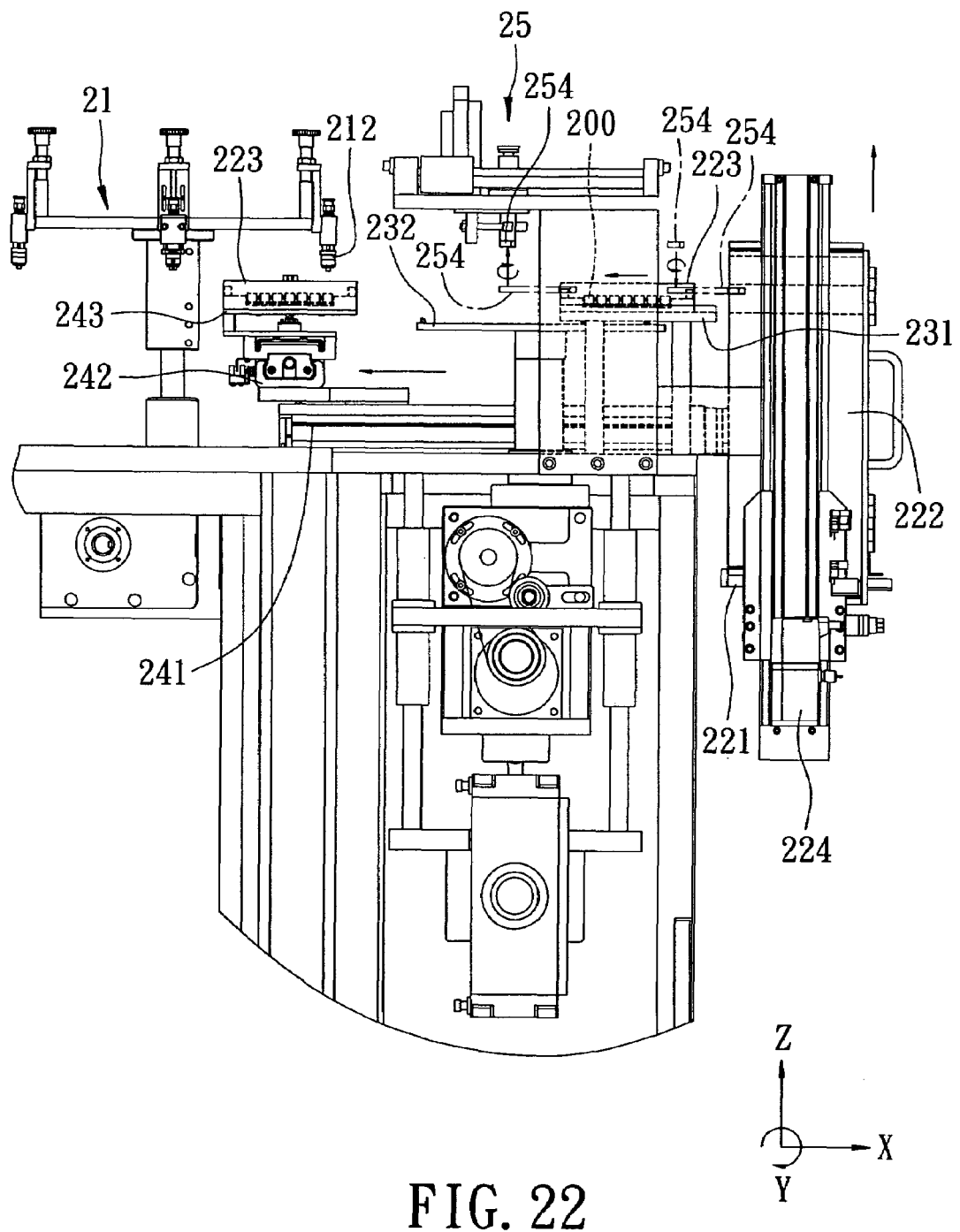

In the step (B), referring to FIGS. 22 and 23, to enable the barrels 200 to be moved onto the barrel-clamping units 13, it is necessary to move one of the barrel-supporting trays 223 from the storage bin 222 onto the barrel standby platform 243 in a manner as described hereinafter. Referring to FIG. 19, the vertically movable seat 2521 of the vertically movable cylinder 252 of the barrel transportation unit 25 moves the dragging hook 254 downwardly to a predetermined position. At this time, the rotating cylinder 253 rotates the dragging hook 254 to engage the projection 2231 of the front end of the first barrel-supporting tray 223 with the engaging groove 2541 in the dragging hook 254. Subsequently, the movable seat 2511 of the rodless cylinder 251 moves the dragging hook 254 toward the temporary barrel-supporting unit 23 along the second direction (X) so as to move the first barrel-supporting tray 223 from the storage bin 222 onto the supporting frame 231 of the temporary barrel-supporting unit 23. At this time, the rotating cylinder 253 rotates the dragging hook 254 so as to remove the projection 231 of the first barrel-supporting tray 223 from the engaging groove 2541. Thereafter, the vertically movable seat 2521 of the vertically movable cylinder 252 moves the dragging hook 254 upwardly. Referring to FIGS. 20 and 21, the cam unit 233 drives the cam wheel 232 to move upwardly, rotate by an angle of 180°, and move downwardly. Therefore, the first barrel-supporting tray 223 is removed from the supporting frame 231, is brought into alignment with the barrel standby platform 243, and is placed onto the barrel standby platform 243 such that the first barrel-supporting tray 223 separates from the cam wheel 232. Referring to FIG. 22, the upper railing rail 242 is moved along the lower sliding rail 241 toward the lens-feeding device 21 so as to move the barrel standby platform 243 and the first barrel-supporting tray 223 to a position under the first barrel holder 212. On the other hand, the driving unit 224 drives the bottom frame 221 and the storage bin 222 to move upwardly along the first direction (Z) in response to the movement of the first barrel-supporting tray 223 onto the barrel standby platform 243. The dragging hook 254 of the barrel transportation unit 25 moves the second barrel-supporting tray 223 from the storage bin 222 onto the temporary barrel-supporting unit 23 in a manner as described above.

Figure 23:
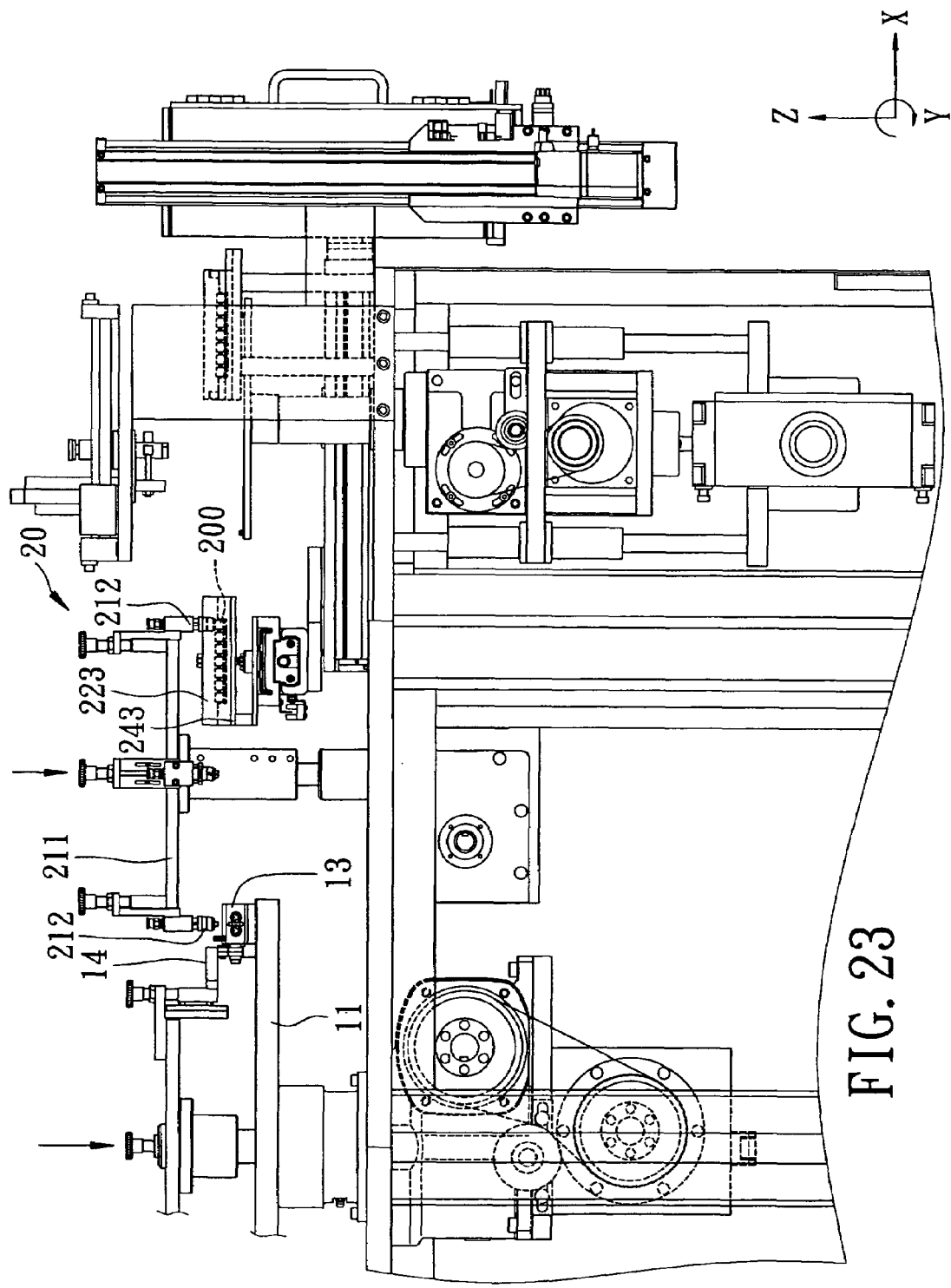
FIGS. 23, 24, 25, and 26 are schematic views of the barrel-feeding station of the preferred embodiment, illustrating how a barrel is moved from a lens-supporting tray onto the barrel-clamping unit by the barrel-feeding device.
Figure 24:
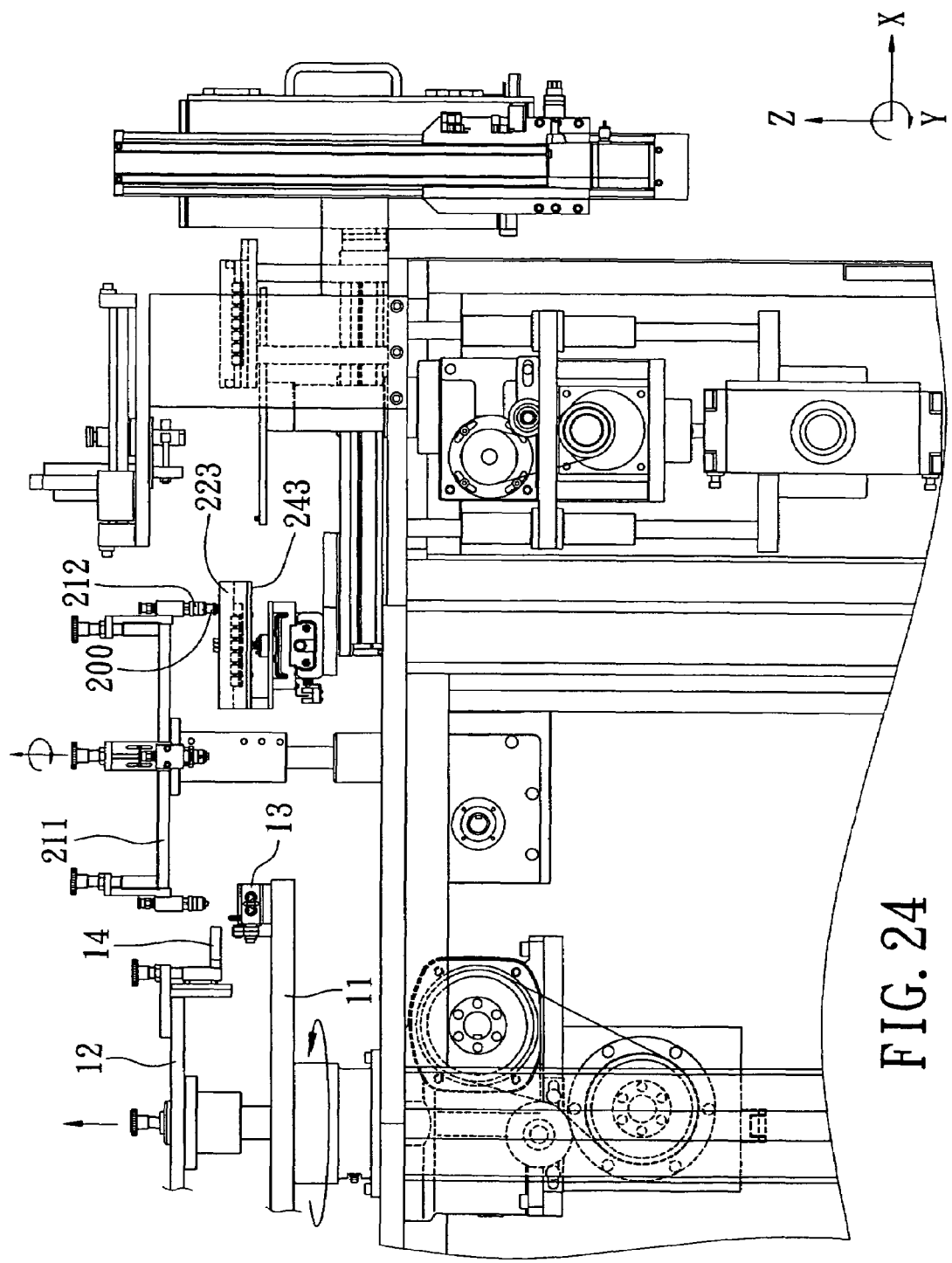
Figure 25:
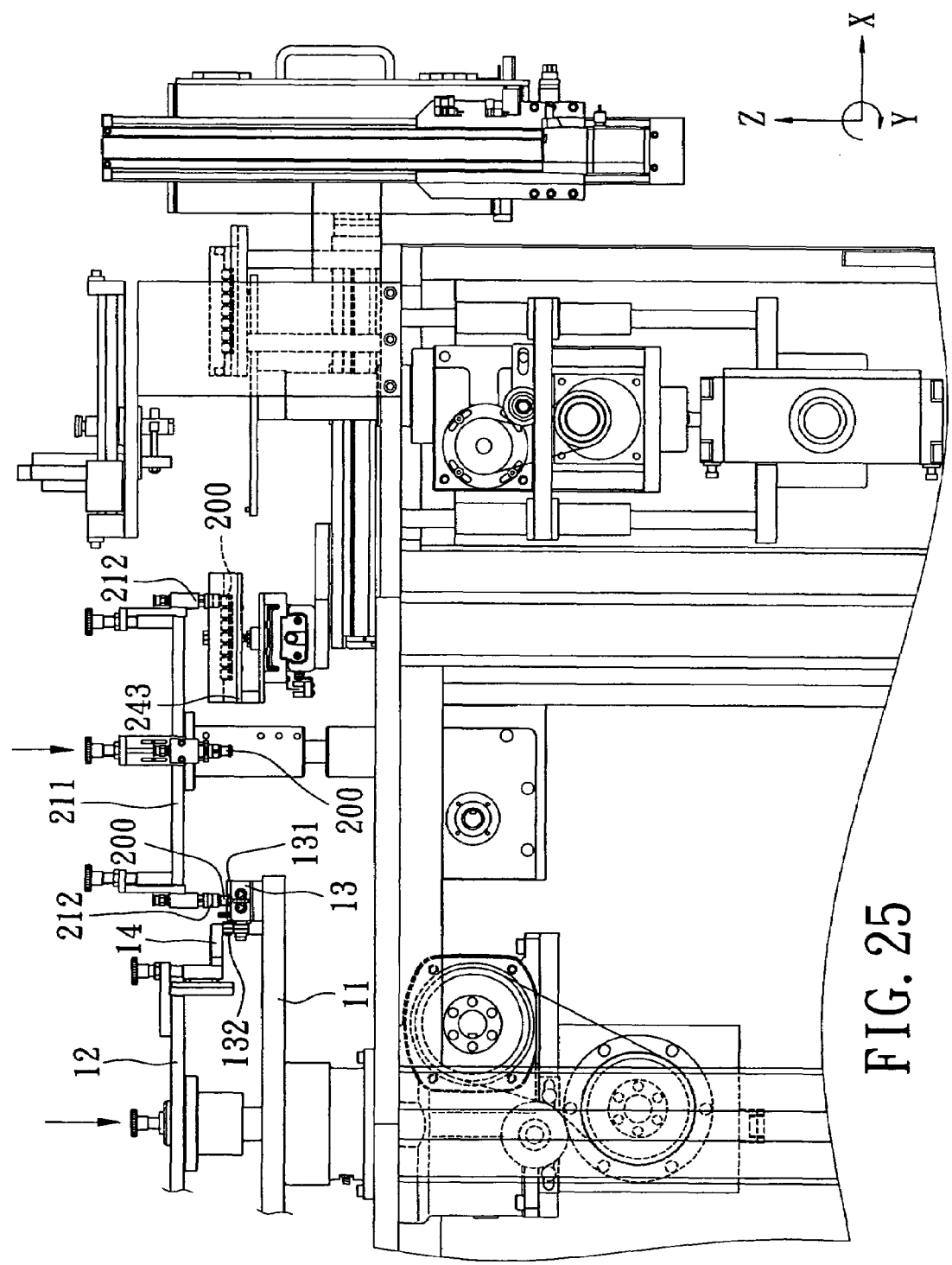
Figure 26:
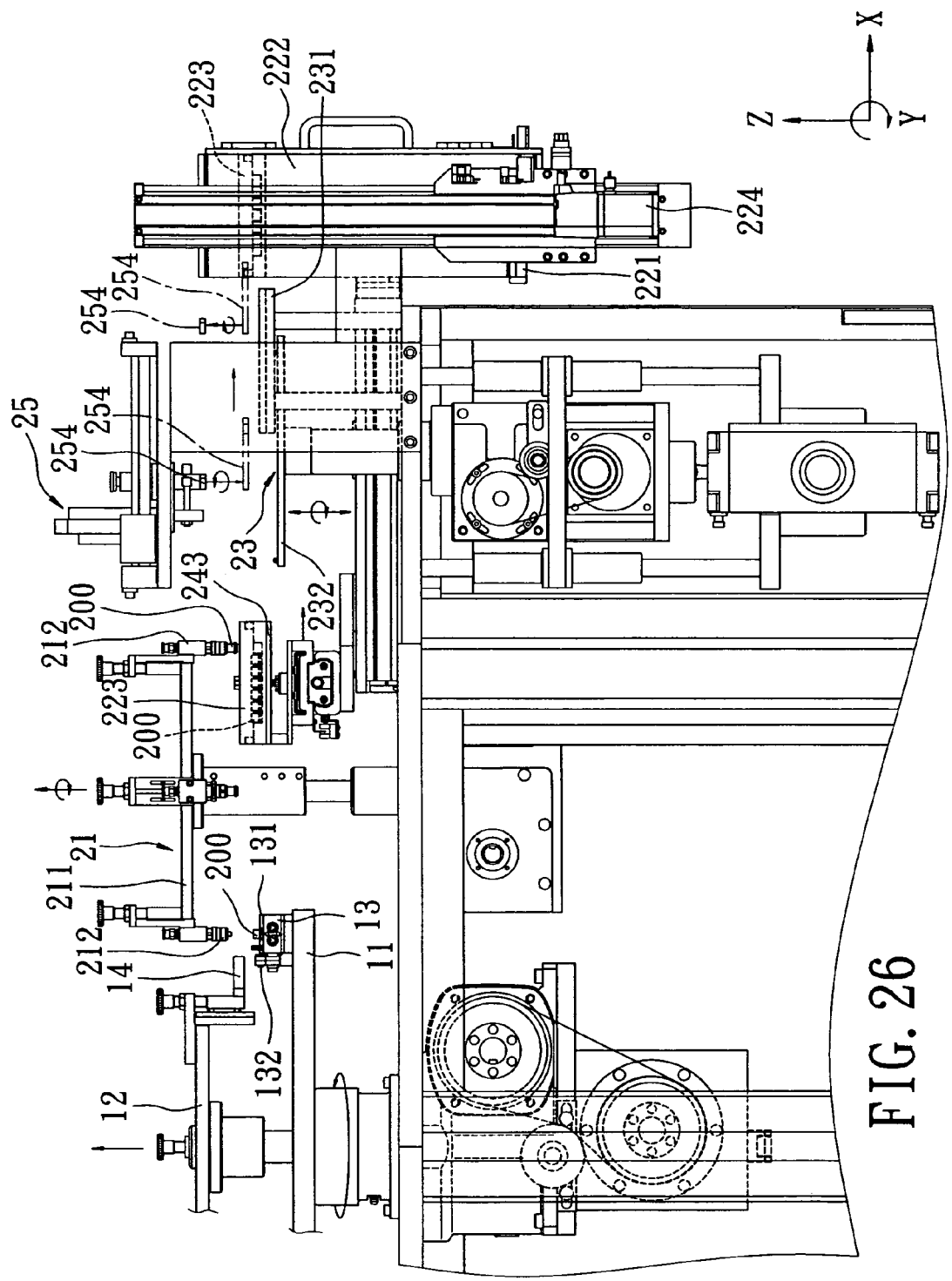

Referring to FIGS. 11, 14, and 23, during the 90°-rotation period (III 1), the main disk 11 and the cam wheel 211 rotate by angles of 30° and 90°, respectively. At the end of the 90°-rotation period (III 1), the corresponding barrel-clamping unit 13 is brought into alignment with the barrel-feeding station 20 by the main disk 11, and the first barrel holder 212 is rotated to a position that is located directly above the corresponding barrel-clamping unit 13. During the descending period (IV 4), the cam wheel 211 moves the barrel holders 212 downwardly by the distance (L4). During the stop period (IV 5), the first barrel holder 212 holds the first barrel 200. Referring to FIGS. 11 and 24, during the ascending period (IV 6), the cam wheel 211 moves the first barrel holder 212 and the first barrel 200 upwardly by the distance (L4) so as to remove the first barrel 200 from the first barrel-supporting tray 223. After the stop period (I 3, III 2) ends, the cam wheel 211 continues to move the barrel holders 212 upwardly, and subsequently rotates the same, and the cam wheel 12 moves the pressing rods 14 upwardly. Thereafter, the main disk 11 rotates the barrel-clamping units 13. Referring to FIGS. 11 and 25, during the pressing-out period (II 5), the cam wheel 211 moves the first barrel holder 212 and the first barrel 200 to a position that is located directly above the corresponding barrel-clamping unit 13, after which the first barrel holder 212 is moved downwardly by the distance (L3) by the cam wheel 211. The cam wheel 12 drives the corresponding pressing rod 14 to press downwardly against the toggle link unit 132 of the corresponding barrel-clamping unit 13 so as to move the clamping members 131 away from each other, as shown in FIG. 8. During the descending period (IV 4), the cam wheel 211 moves the barrel holders 212 downwardly by the distance (L4). During the lower point-staying period (IV 5), the first barrel holder 212 located directly above the corresponding barrel-clamping unit 13 releases and moves the first barrel 200 into a space between the clamping members 131. On the other hand, a second one of the barrel holders 212 located directly above the barrel standby platform 243 holds a second one of the barrels 200 from the first barrel-supporting tray 223. Referring to FIGS. 11 and 26, during the ascending period (IV 6), the cam wheel 211 moves the barrel holders 212 and the second barrel 200 upwardly by the distance (L4) so as to remove the first barrel holder 212 from the first barrel 200 disposed on the corresponding barrel-clamping unit 13. During the clamping period (II 1), the cam wheel 12 moves the pressing rods 14 upwardly by the distance (L2) so as to remove the corresponding pressing rod 14 from the toggle link unit 132 of the corresponding barrel-clamping unit 13.

This causes the first barrel 200 to be clamped between the clamping members 131 of the corresponding barrel-clamping unit 13.

Therefore, the lens-feeding device 21 can cooperate with the intermittent rotations of the barrel-clamping units 13 to move the barrels 200 from the first barrel-supporting tray 223 disposed on the barrel standby platform 243 onto the barrel-clamping units 13 in sequence. In this process, the barrel standby platform 243 moves along the second and third directions (X, Y) such that the barrel holders 212 can hold all of the barrels 200 disposed on the first barrel-supporting tray 223 in sequence.

Referring to FIG. 26, when all of the barrels 200 disposed on the first barrel-supporting tray 223 are removed from the first barrel-supporting tray 223, the empty barrel standby platform 243 is moved toward the cam wheel 232 of the temporary barrel-supporting unit 23. Thereafter, the cam wheel 232 moves upwardly, rotates by an angle of 180°, and moves downwardly so as to interchange the positions of the first and second barrel-supporting trays 223. Hence, the empty first barrel-supporting tray 223 is moved back into the storage bin 222 by the dragging hook 254 of the barrel transportation unit 25 along the second direction (X), after which the driving unit 224 moves the bottom frame 221 and the storage bin 222 upwardly along the first direction (Z). On the other hand, the second barrel-supporting tray 223 is moved from the temporary barrel-supporting unit 23 onto the barrel standby platform 243.

Referring to FIG. 33, the step (C) includes the substeps of:

(C1) cooperating with the intermittent rotations of the barrel-clamping units 13 to move the first lenses (300A) from the first lens standby area of the first lens-feeding station (30A) into the barrels 200 respectively and sequentially;

(C2) cooperating with the intermittent rotations of the barrel-clamping units 13 to move the second lenses (300B) from the second lens standby area of the second lens-feeding station (30B) into the barrels 200 respectively and sequentially such that the second lenses (300B) overlie respectively the first lenses (300A);

(C3) cooperating with the intermittent rotations of the barrel-clamping units 13 to move the third lenses (300C) from the third lens standby area of the third lens-feeding station (30C) into the barrels 200 respectively and sequentially such that the third lenses (300C) overlie respectively the second lenses (300B); and (C4) cooperating with the intermittent rotations of the barrel-clamping units 13 to move the fourth lenses (300D) from the fourth lens standby area of the fourth lens-feeding station (30D) into the barrels 200 respectively and sequentially such that the fourth lenses (300D) overlie respectively the third lenses (300C) to form the camera lens units 400, each of which includes one of the barrels 200 and four stacked lenses (300A, 300B, 300C, 300D). The first, second, third, and fourth lens standby areas constitute a lens standby area assembly.

In the step (C), referring to FIGS. 15, 16, 27, 28, 29, 30, 31, 32, and 33, to enable the lenses (300A, 300B, 300C, 300D) to move into the barrels 200 clamped on the barrel-clamping units 13, it is necessary to move one of the lens-supporting trays 323 onto the lens standby platform 343. In each of the lens-feeding stations (30A, 30B, 30C, 30D), the process for moving the lens-supporting trays 323 from the storage bin 322 onto the barrel-clamping units 13 is similar to that for moving the barrel-supporting trays 223 (see FIGS. 12 and 13) onto the barrel-clamping units 13, and includes the steps of:

providing the lens-supporting trays 323 within the lens storage unit 32 of such that the lens-supporting trays 323 are arranged one above another, each of the lens-supporting trays 323 receiving a plurality of lenses (300A, 300B, 300C, 300D) thereon;

moving the first lens-supporting tray 323 vertically from the storage bin 323 onto the temporary lens-supporting unit 33 by the lens transportation unit 35 along the first direction (Z');

moving the first lens-supporting tray 323 horizontally from the temporary lens-supporting unit 33 onto the lens standby platform 343 along the second direction (X');

moving the lens standby platform 343 along the second and third directions (X', y') so that the lens-feeding device 31 can move all of the lenses (300A, 300B, 300C, 300D) disposed on the first lens-supporting tray 323 respectively into the barrels 200 clamped on the barrel-clamping units 13 in sequence;

moving the second lens-supporting tray 323 onto the temporary lens-supporting unit 33 by the lens transportation unit 35 in response to movement of the first lens-supporting tray 323 onto the lens standby platform 343;

moving the lens standby platform 343 toward the temporary lens-supporting unit 33 in response to removal of all of the lenses (300A, 300B, 300C, 300D) disposed on the first lens-supporting tray 323 respectively into the barrels 200 clamped on the barrel-clamping units 13;

interchanging the positions of the first and second lens-supporting trays 323;

moving the first lens-supporting tray 323 from the temporary lens-supporting unit 33 into the storage bin 322 by the lens transportation unit 35; and moving the second lens-supporting tray 323 from the temporary lens-supporting unit 35 onto the lens standby platform 343.

Figure 27:
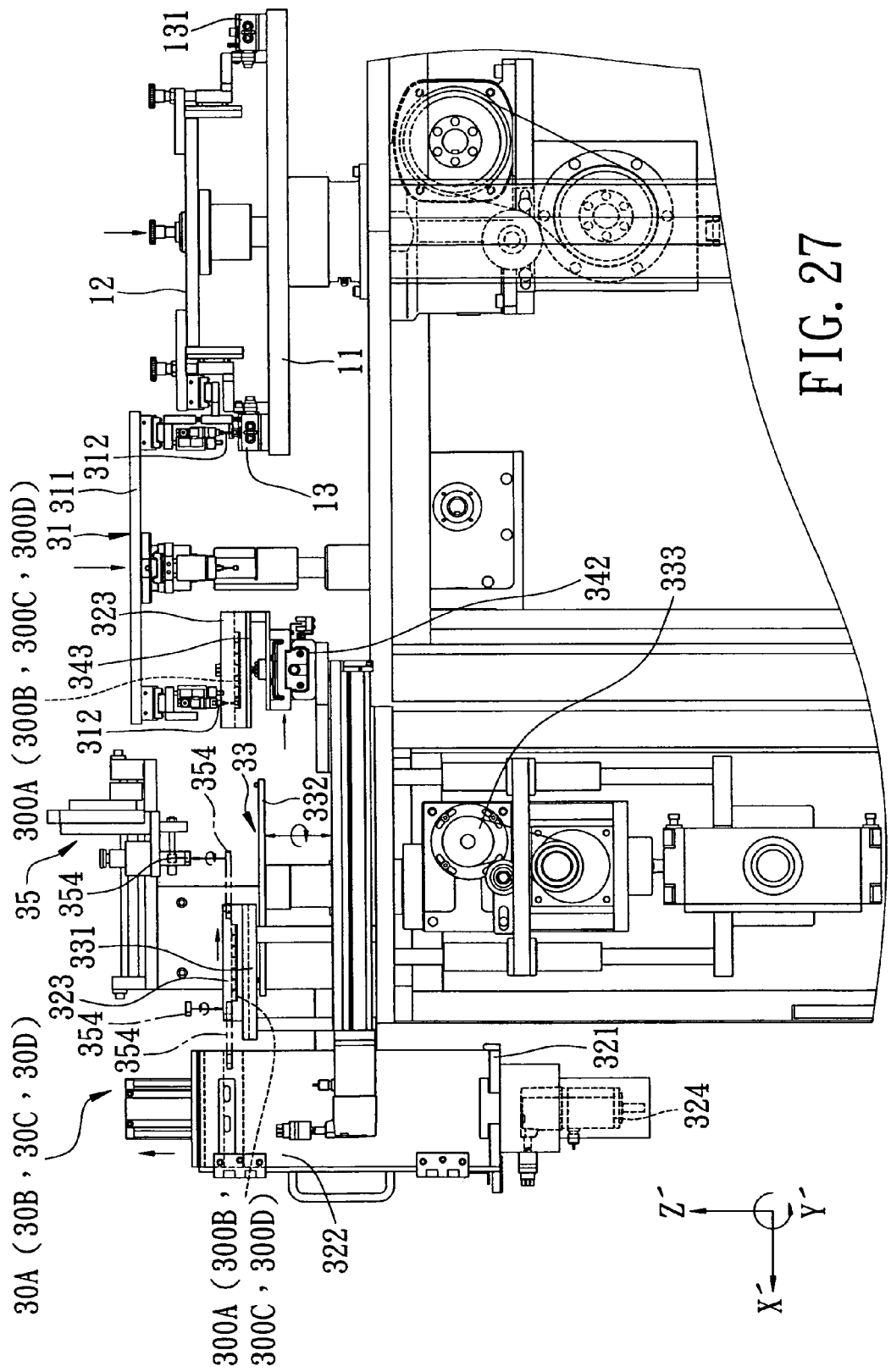
FIGS. 27, 28, 29, and 30 are schematic views of the lens-feeding station of the preferred embodiment, illustrating how a lens is moved from the lens-supporting tray into the barrel clamped on the barrel-clamping unit of the main workstation by a lens-feeding device.
Figure 28:
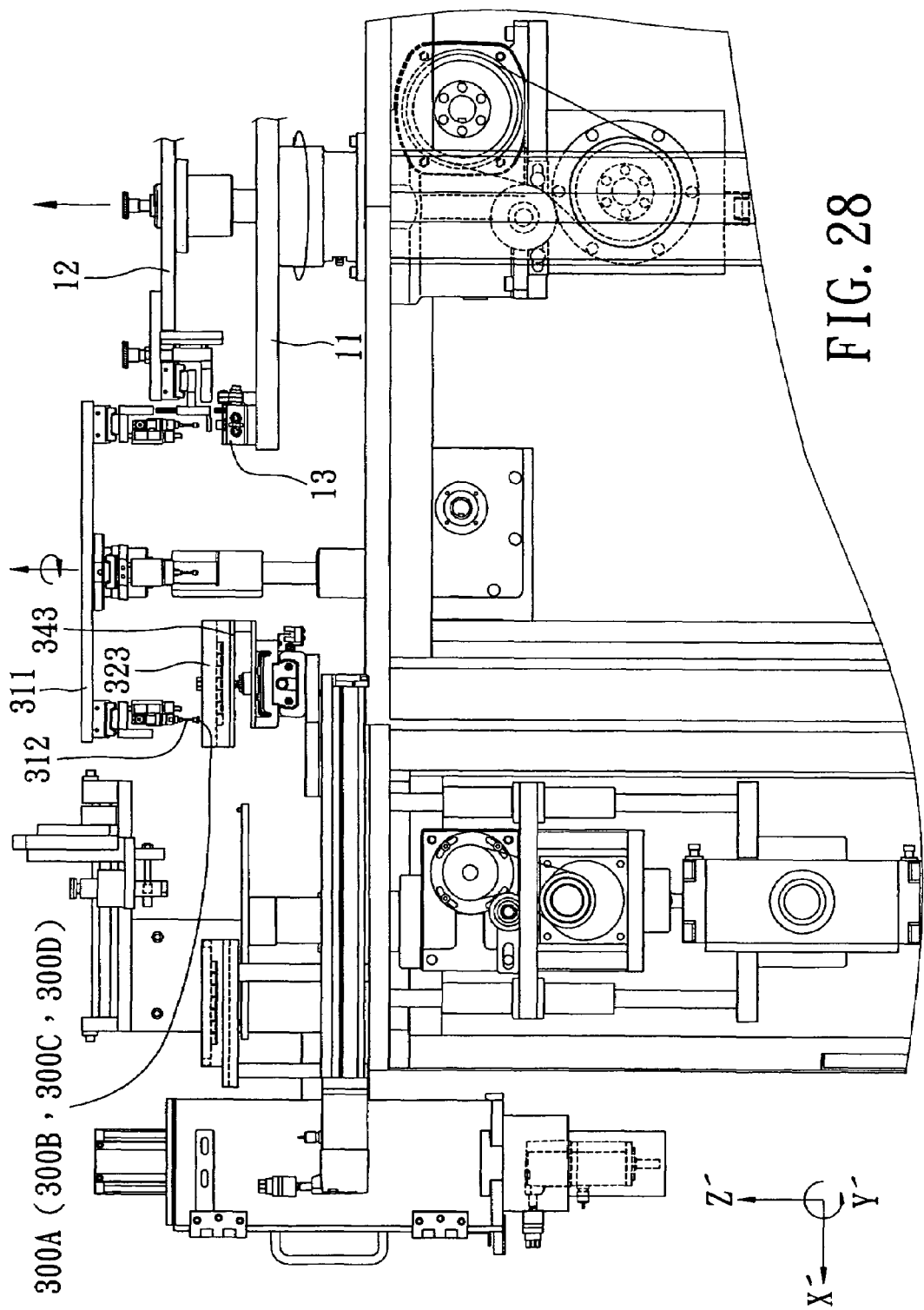

Referring to FIG. 27, during the operation of each of the lens-feeding stations (30A, 30B, 30C, 30D), the dragging hook 354 of the lens transportation unit 35 moves the first lens-supporting tray 323 from the storage bin 322 onto the supporting frame 331 of the temporary lens-supporting unit 33. Thereafter, the cam unit 333 drives the cam wheel 332 to move upwardly, rotate by an angle of 180°, and move downwardly so as to move the first lens-supporting tray 323 onto the lens standby platform 343. The upper sliding rail 342 moves the lens standby platform 343 to a position under one of the lens-sucking members 312. When the cam wheel 332 moves the first lens-supporting tray 323 onto the lens standby platform 343, the driving unit 324 drives the bottom frame 321 and the storage bin 322 to move upwardly along the first direction (Z'). Hence, the dragging hook 354 moves the second lens-supporting tray 323 onto the supporting frame 333, and is therefore ready for interchanging with the empty first lens-supporting tray 323.

Figure 29:
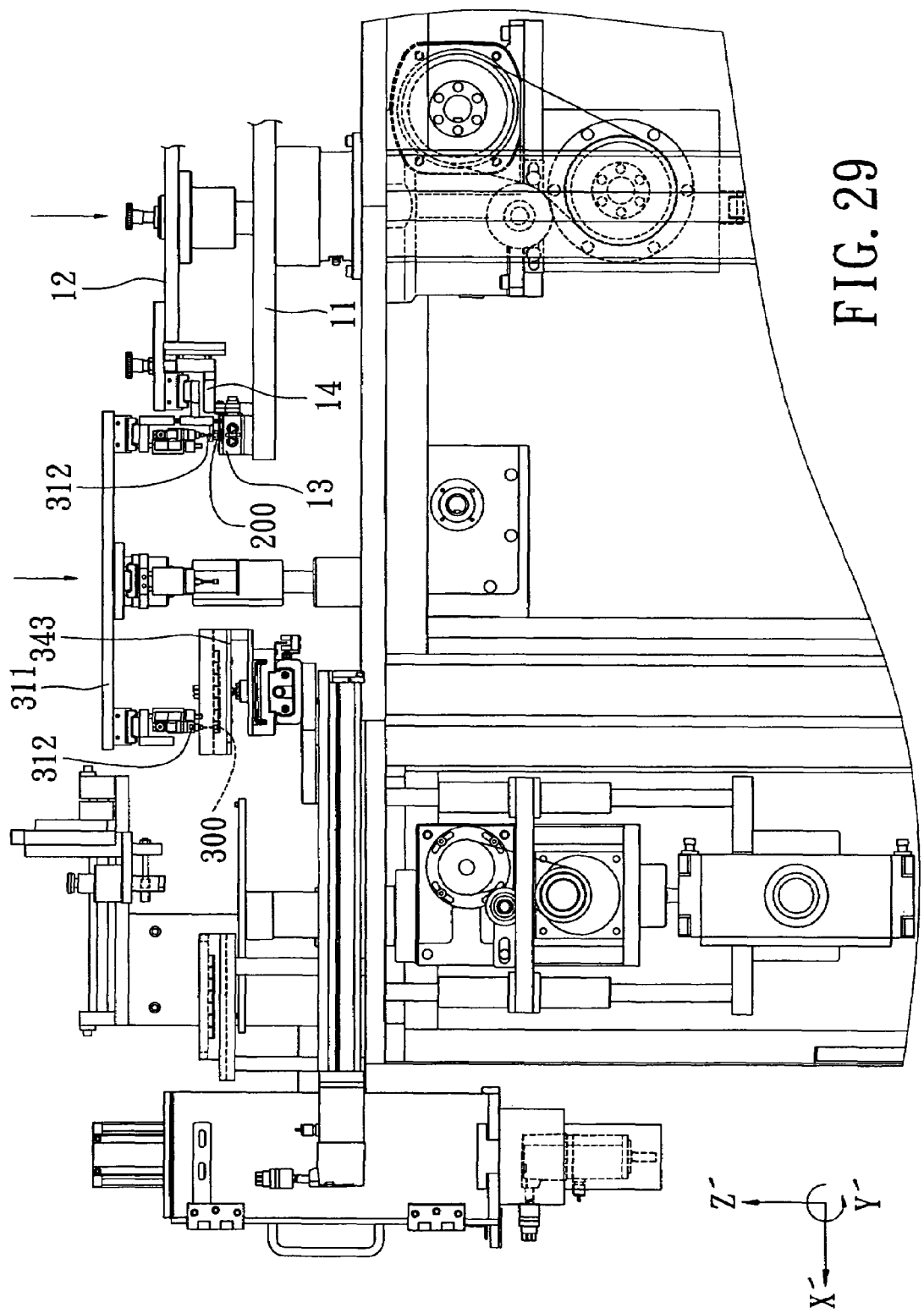
Figure 30:
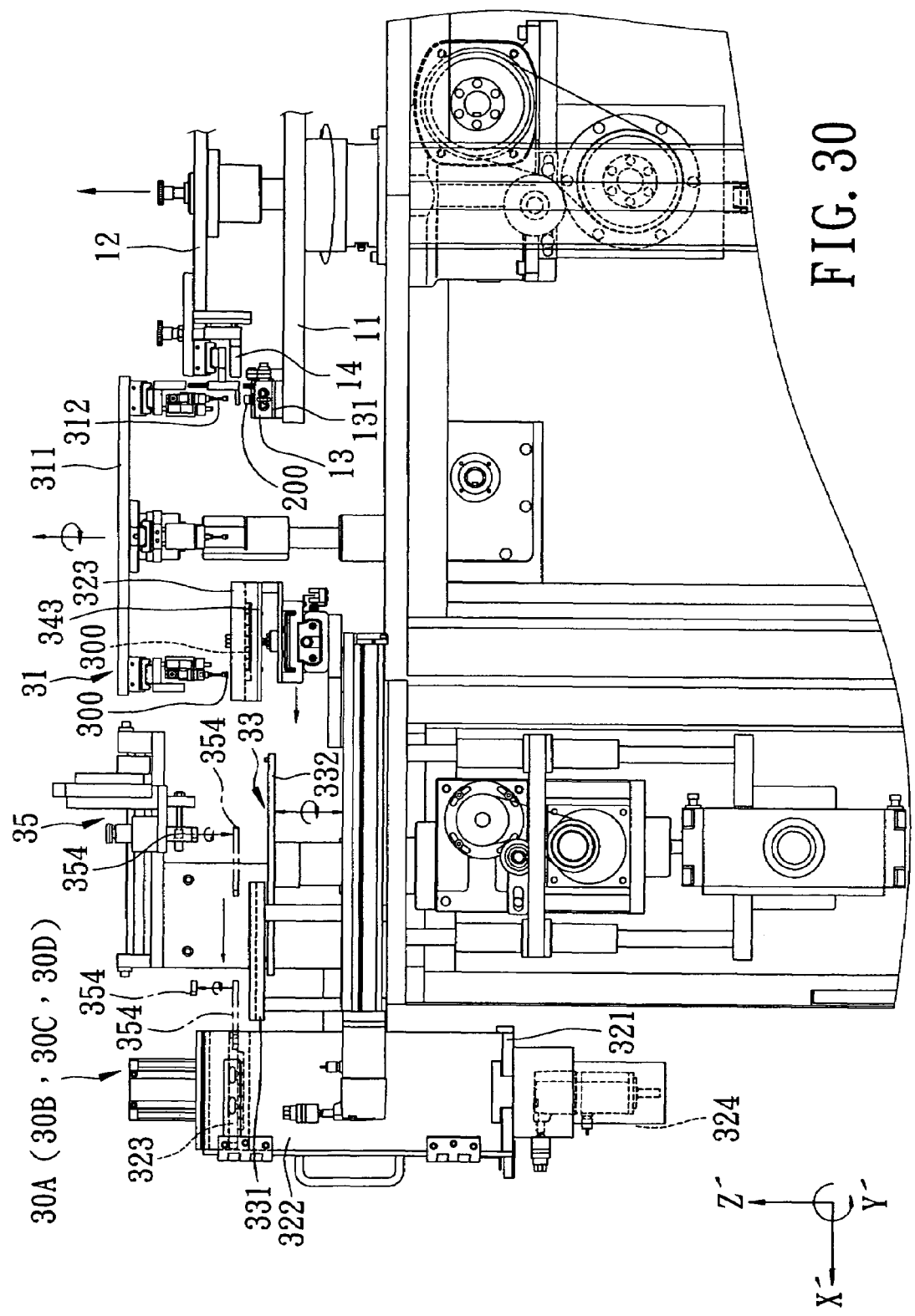
Figure 31:
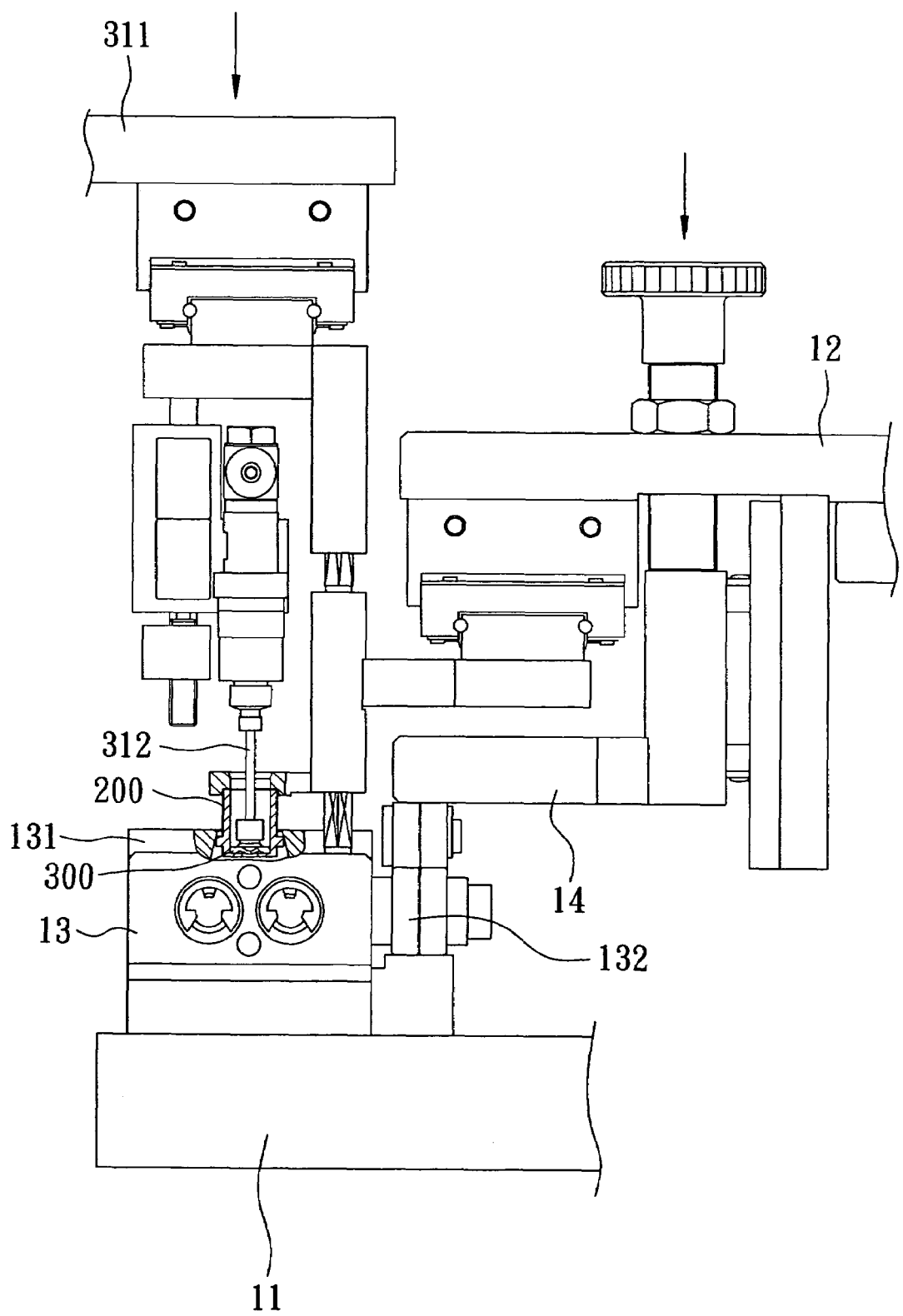
FIG. 31 is an enlarged view of a portion of FIG. 29.
Figure 32:
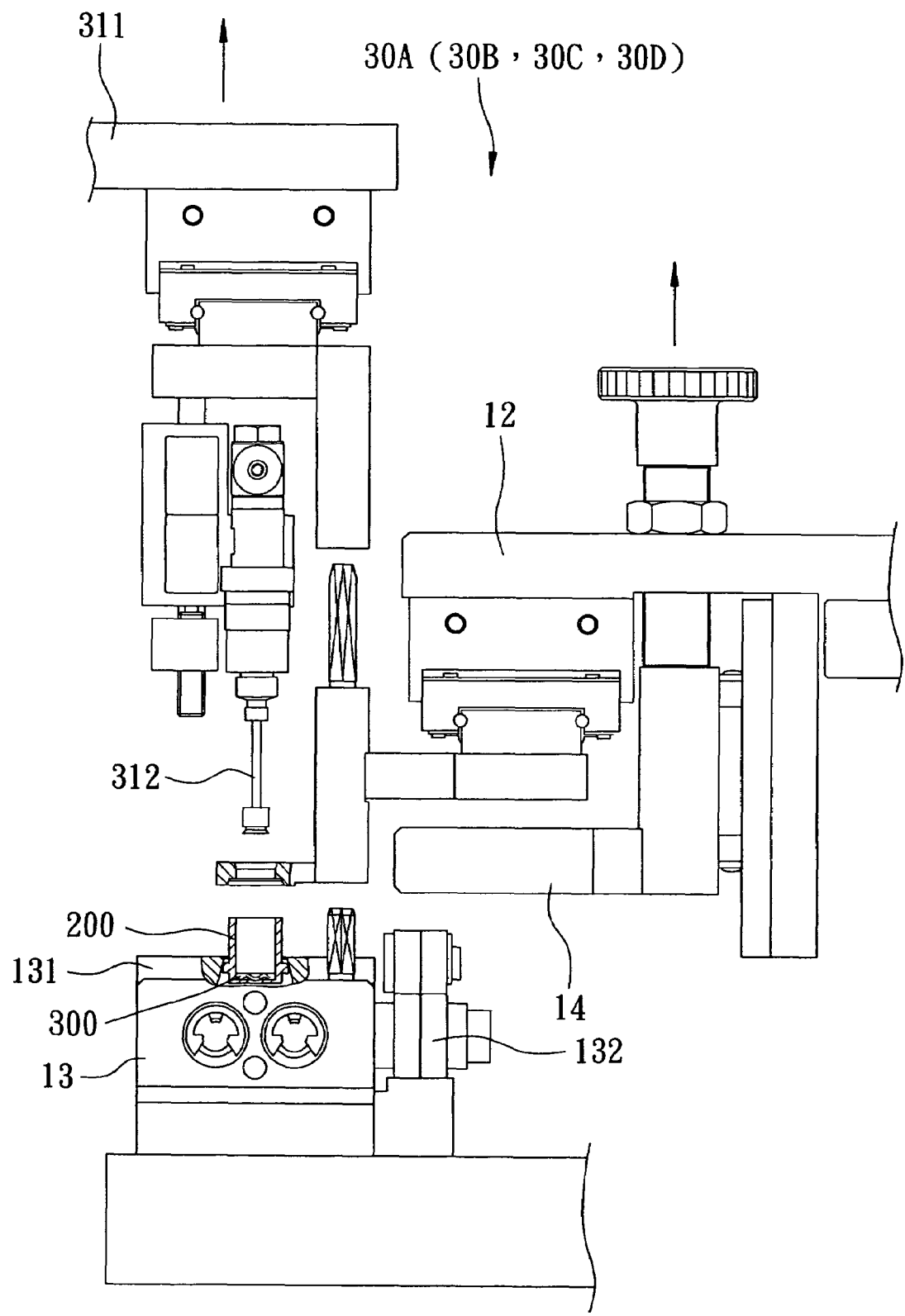
FIG. 32 is an enlarged view of a portion of FIG. 30.

Referring to FIGS. 11, 27, and 33, during the 90°-rotation period (III 1), the main disk 11 and the cam wheel 31 rotate by angles of 30° and 90°, respectively. Therefore, one of the barrel-clamping units 13 is brought into alignment with the lens-feeding station (30A, 30B, 30C, 30D). On the other hand, one of the lens-sucking members 312 is moved to a position directly above the one of the barrel-clamping units 13. Another of the lens-sucking members 312 is moved to a position directly above the first lens-supporting tray 323. During the descending period (IV 4), the cam wheel 311 moves the lens-sucking members 312 downwardly by the distance (L4). During the lower point-staying period (IV 5), the lens-sucking member 312 that is disposed directly above the lens standby platform 343 sucks the first lens (300A, 300B, 300C, 300D). During the ascending period (IV 6), the cam wheel 311 moves the first lens (300A, 300B, 300C, 300D) upwardly by the distance (L4) to separate from the first lens-supporting tray 323 after the stop period (I 3, III 2) ends, the cam wheel 311 continues to move the lens-sucking members 312 upwardly, and subsequently rotates the same. On the other hand, the cam wheel 12 moves the corresponding pressing rod 14 upwardly. Thereafter, the main disk 11 rotates the barrel-clamping units 13. Referring to FIGS. 11, 29, and 31, during the pressing-out period (II 5), the cam wheel 311 rotates an assembly of the first lens (300A, 300B, 300C, 300D) and the lens-sucking member 312 to a position directly above the barrel 200 clamped on the barrel-clamping unit 13, and moves downwardly by the distance (L3). The cam wheel 12 drives the corresponding pressing rod 14 to press downwardly against the toggle link unit 132 of the barrel-clamping unit 13 so as to move the clamping members 131 away from each other, as shown in FIG. 8. Therefore, the barrel 200 is released from the barrel-clamping unit 13. During the descending period (IV 4), the cam wheel 311 moves the assembly of the first lens (300A, 300B, 300C, 300D) and the lens-sucking member 312 downwardly by the distance (L4) During the lower point-staying period (IV 5), the lens-sucking member 312 that is disposed directly above the barrel-clamping unit 13 releases the first lens (300A, 300B, 300C, 300D) therefrom so as to allow for movement of the first lens (300A, 300B, 300C, 300D) into the released barrel 200. On the other hand, the lens-sucking member 312 that is disposed directly above the lens standby platform 343 sucks the second lens (300A, 300B, 300C, 300D) from the first lens-supporting tray 323. Referring to FIGS. 11, 30, and 32, during the ascending period (IV 6), the cam wheel 311 moves the lens-sucking members 312 and the second lens (300A, 300B, 300C, 300D) by the distance (L4) so as to remove the lens-sucking member 300 disposed directly above the barrel-clamping unit 13 from the first lens (300A, 300B, 300C, 300D) within the barrel 200. During the clamping period (II 1), the cam wheel 12 moves the corresponding pressing rod 14 upwardly by the distance (L2) so as to remove the corresponding pressing rod 14 from the toggle link unit 132 of the barrel-clamping unit 13, thereby permitting the clamping members 131 to clamp the barrel 200 therebetween, as shown in FIG. 6.

Therefore, the lens-feeding device 31 can cooperate with the intermittent rotation of the barrel-clamping units 13 to move the lenses (300A, 300B, 300C, 300D) from the first lens-supporting tray 323 into the barrel 200 disposed on the barrel-clamping unit 13 in sequence. In this process, the lens standby platform 343 moves along the second and third direction (X', y') so as to enable all of the lenses (300A, 300B, 300C, 300D) disposed on the first lens-supporting tray 323 to be sucked by the lens-sucking members 312 in sequence.

Referring to FIG. 30, when all of the lenses (300A, 300B, 300C, 300D) disposed on the first lens-supporting tray 323 are moved onto the barrel-clamping units 13 by the lens-sucking members 312, the first lens-supporting tray 323 is moved toward the cam wheel 332 of the temporary lens-supporting unit 33. The cam wheel 332 is moved upwardly, is rotated by an angle of 180 degrees, and is moved downwardly so as to interchange the positions of the first and second lens-supporting trays 323. Thereafter, the second lens-supporting tray 323 is moved onto the lens standby platform 343. The first lens-supporting tray 323 is moved back into the storage bin 322 by the dragging hook 354 of the lens transportation unit 35. The driving unit 324 moves the bottom frame 321 and the storage bin 322 upwardly in the first direction (Z'), as shown in FIG. 27.

Referring to FIGS. 2, 33, and 35, during the stop period (I 3), when one of the camera lens units 400 pass by the height-detecting unit 70, the gauge 72 of the height-detecting unit 70 presses against the fourth lens (300D) so as to detect the total height of the stacked lenses (300A, 300B, 300C, 300D) within the corresponding barrel 200. When detecting that the total height of the stacked lenses (300A, 300B, 300C, 300D) exceeds the preset height range, the corresponding camera lens unit 400 is moved into a return area (not shown). When the total height of the stacked lenses (300A, 300B, 300C, 300D) falls within the preset height range, the corresponding camera lens unit 400 is rotated once again by an angle of 60° to align with the camera lens-removing station 50 so as to proceed the step (D).

Referring to FIGS. 2, 33, 36, 37, 38, and 39, the step (D) includes the substeps of:

providing the camera lens-supporting trays 523 within the storage bin 522 such that the camera lens-supporting trays 523 are arranged one above another;

moving the first camera lens-supporting tray 523 vertically from the storage bin 522 onto the temporary camera lens-supporting unit 53 by the camera lens transportation unit 55 along the first direction (Z");

moving the first camera lens-supporting tray 523 horizontally from the temporary camera lens-supporting unit 53 onto the accepting platform 543 along the second direction (X");

moving the accepting platform 543 along the second and third directions (X", y") so that the camera lens-removing device 51 can move the camera lens units 400 from the barrel-clamping units 13 onto the first camera lens-supporting tray 523 in sequence such that the camera lens units 400 are placed at different positions of the first camera lens-supporting tray 523;

moving the second camera lens-supporting tray 523 from the storage bin 522 onto the temporary camera lens-supporting unit 53 by the camera lens transportation unit 55 in response to movement of the first camera lens-supporting tray 523 onto the accepting platform 543;

moving the accepting platform toward the temporary camera lens-supporting unit 53 in response to full of the camera lens units 400 within the first camera lens-supporting tray 523;

interchanging the positions of the first and second camera lens-supporting trays 523;

moving the first camera lens-supporting tray 523 from the temporary camera lens-supporting unit 53 into the storage bin 522 by the camera lens transportation unit 55;

moving the second camera lens-supporting tray 523 from the temporary camera lens-supporting unit 53 onto the accepting platform 543.

Figure 36:
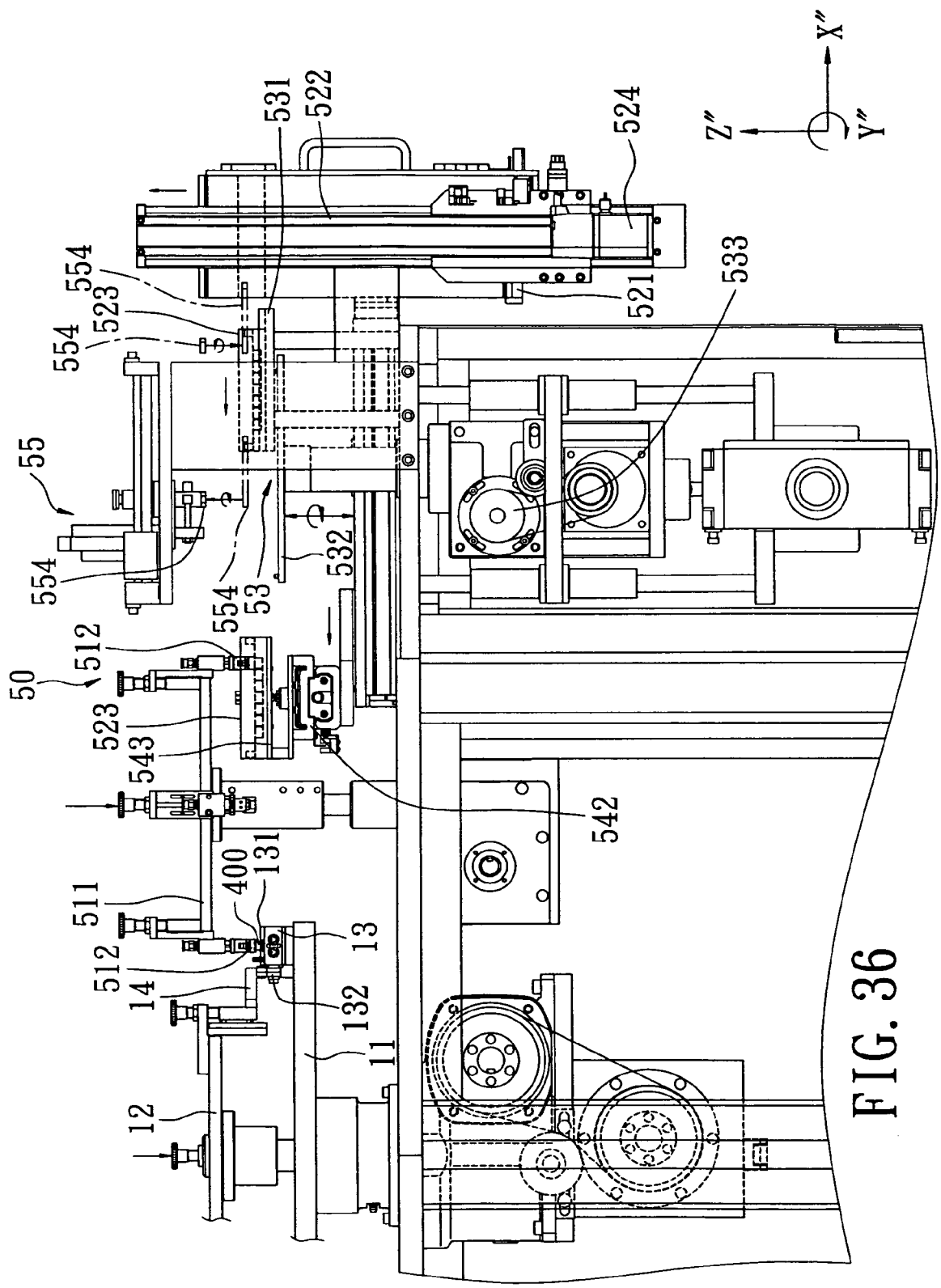
FIGS. 36, 37, 38, and 39 are schematic views of the camera lens-removing station of the preferred embodiment, illustrating how the camera lens unit is moved from the barrel-clamping unit of the main workstation onto a camera lens-supporting tray by a camera lens-removing device.

In the step (D), to enable the barrels 200 to be moved from the barrel-clamping units 13 onto the accepting platform 543, it is necessary to move one of the camera lens-supporting trays 523 onto the accepting platform 543. Referring to FIG. 36, the dragging hook 554 of the camera lens transportation unit 55 moves the empty first camera lens-supporting tray 523 from the storage bin 522 onto the supporting frame 531 of the temporary camera lens-supporting unit 53. The cam unit 533 drives the cam wheel 532 to move upwardly, rotate by an angle of 180°, and move downwardly so as to move the first camera lens-supporting tray 523 onto the accepting platform 543. The upper sliding rail 542 moves an assembly of the accepting platform 543 and the first camera lens-supporting tray 523 to a position under one of the barrel holders 512. On the other hand, when the cam wheel 532 moves the first camera lens-supporting tray 523 onto the accepting platform 543, the driving unit 524 moves the bottom frame 521 and the storage bin 522 upwardly along the first direction (Z"). The dragging hook 554 of the camera lens transportation unit 55 moves the second camera lens-supporting tray 523 onto the supporting frame 531 of the temporary camera lens-supporting unit 53, and is therefore ready for interchanging with the empty first camera lens-supporting tray 523 disposed on the accepting platform 543.

Figure 37:
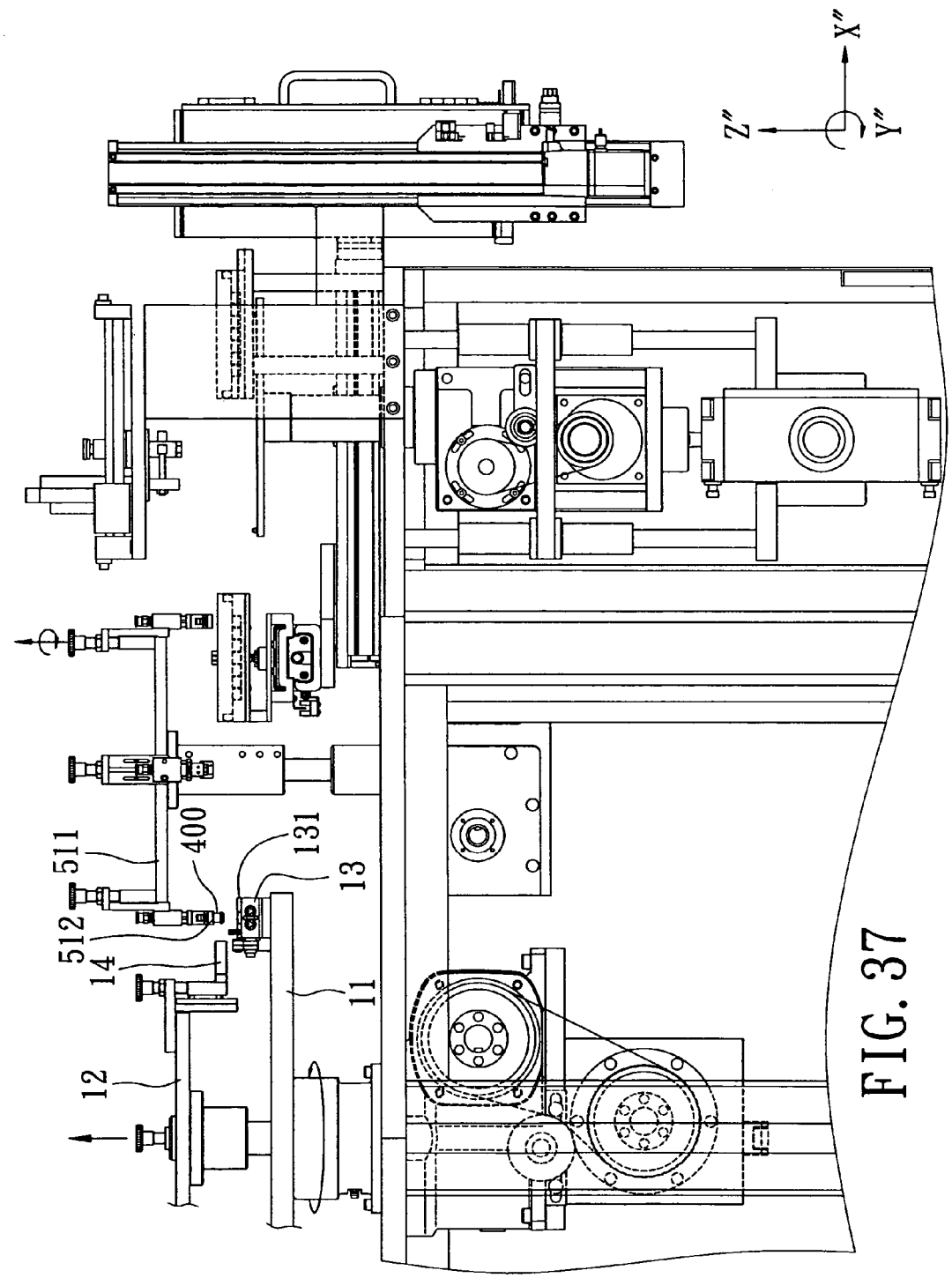

Referring to FIGS. 11 and 36, during the 90°-rotation period (III 1), the main disk 11 and the cam wheel 511 rotate by angles of 30° and 90°, respectively. The corresponding barrel-clamping unit 13 is brought into alignment with the camera lens-removing station 50 by the main disk 11. The cam wheel 12 presses the corresponding pressing rod 14 against the toggle link unit 132 of the barrel-clamping unit 13 so as to move the clamping members 131 away from each other. Thus, the corresponding camera lens unit 400 is released. On the other hand, the first barrel holder 512 is rotated by the cam wheel 511 to a position that is located directly above the corresponding barrel-clamping unit 13. The second barrel holder 512 is rotated by the cam wheel 511 to a position directly above the first camera lens-supporting tray 523 disposed on the accepting platform 543. During the descending period (IV 4), the cam wheel 511 moves the barrel holders 512 downwardly by the distance (L4). During the lower point-staying period (IV 5), the first barrel holder 512 holds the corresponding camera lens unit 400. Referring to FIGS. 11 and 37, during the ascending period (IV 6), the cam wheel 511 moves the first barrel holder 512 and the corresponding camera lens unit 400 upwardly by the distance (L4) so as to remove the corresponding camera lens unit 400 from the corresponding barrel-clamping unit 13. On the other hand, the cam wheel 12 moves the pressing rods 14 upwardly so as to permit the clamping members 131 of the corresponding barrel-clamping unit 13 to move toward each other. Therefore, the corresponding barrel-clamping unit 13 is converted to the barrel-clamping mode. Subsequently, the main disk 11 rotates the barrel-clamping units 13.

Figure 38:
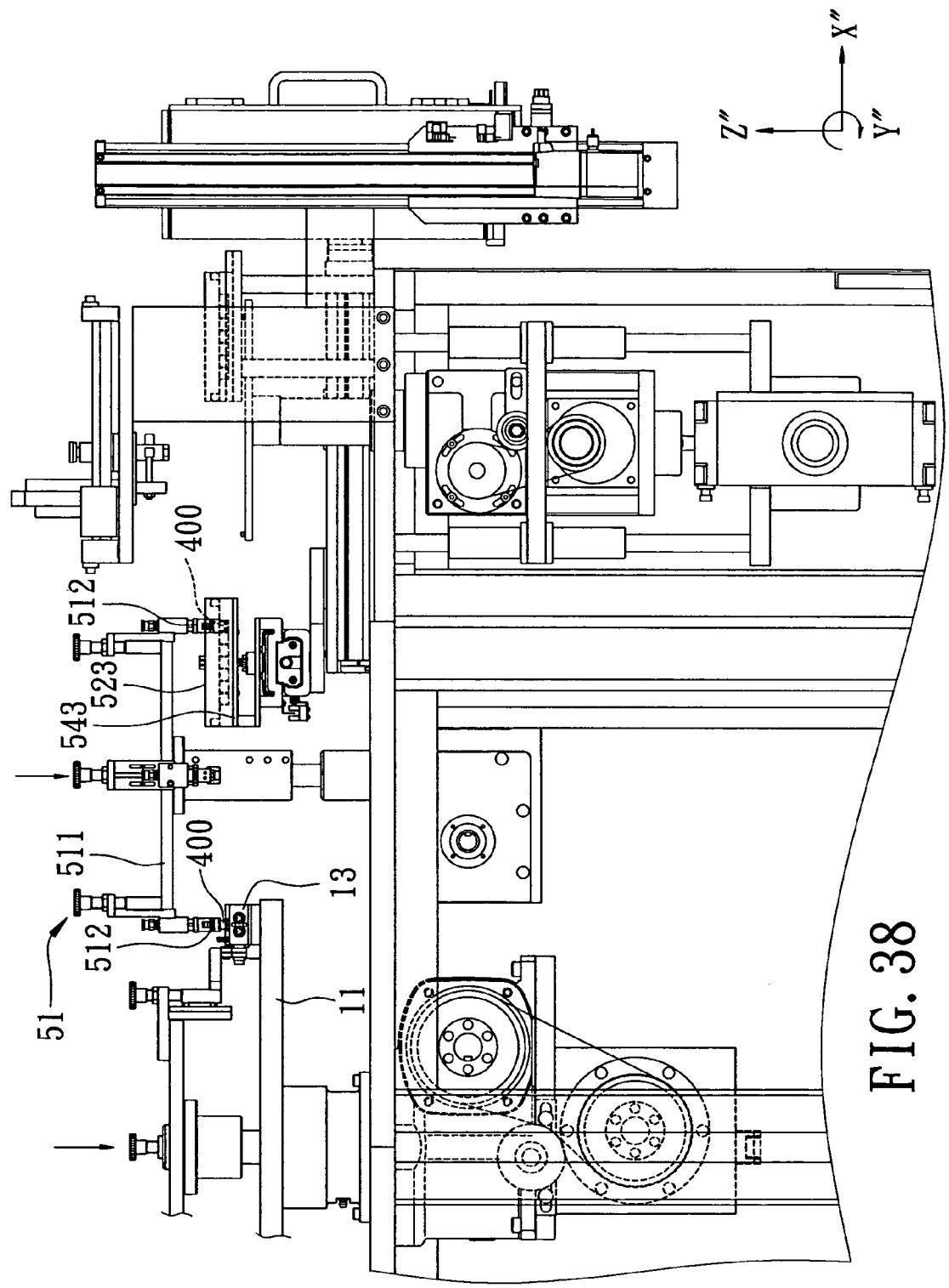

Referring to FIGS. 11 and 38, the cam wheel 511 rotates an assembly of the first barrel holder 512 and the camera lens unit 400 to a position directly above the first camera lens-supporting tray 523 disposed on the accepting platform 543. During the descending period (IV 4), the cam wheel 511 moves the barrel holders 512 downwardly by the distance (L4). During the lower point-staying period (IV 5), the first barrel holder 512 that is located directly above the accepting platform 543 releases and moves the camera lens unit 400 onto the first camera lens-supporting tray 523.

Therefore, the camera lens-removing device 51 can cooperate with the intermittent rotations of the barrel-clamping units 13 to move the camera lens units 400 from the barrel-clamping units 13 onto the first camera lens-supporting tray 523 disposed on the accepting platform 543 in sequence. In this process, the accepting platform 543 moves along the second and third directions (X", Y") such that the camera lens-removing device 51 can move the camera lens units 400 from the barrel-clamping units 13 to different positions of the first camera lens-supporting tray 523 disposed on the accepting platform 543 in sequence.

Figure 39:
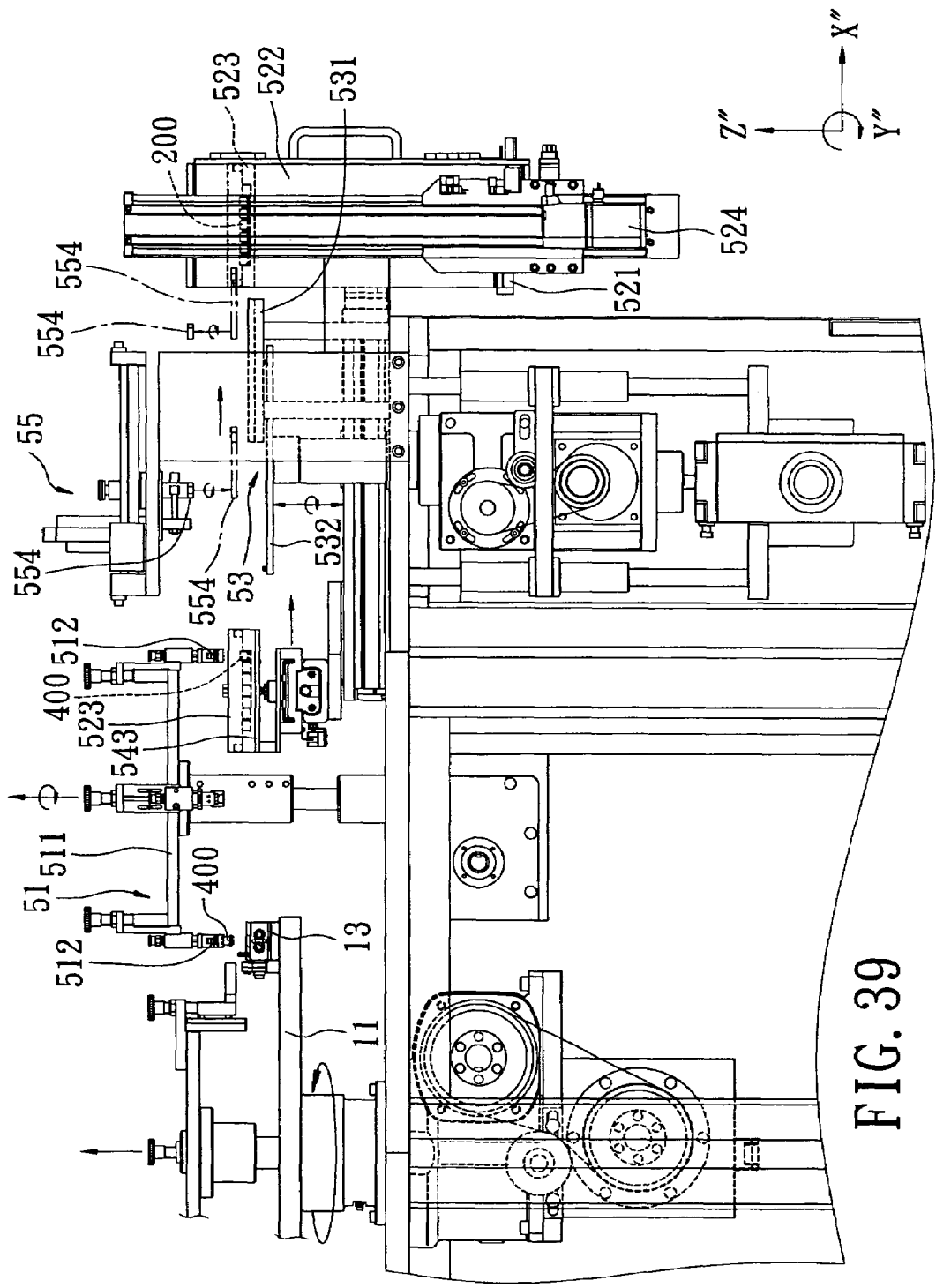

Referring to FIG. 39, the accepting platform 543 is moved toward the cam wheel 532 of the temporary camera lens-supporting unit 53 in response to full of the camera lens units 400 within the first camera lens-supporting tray 523 disposed on the accepting platform 543. Thereafter, the cam wheel 532 moves upwardly, rotates by an angle of 180°, and moves downwardly so as to interchange the positions of the first and second camera lens-supporting trays 523. Hence, the occupied first camera lens-supporting tray 523 is moved back into the storage bin 522 by the dragging hook 554 of the camera lens transportation unit 55 along the second direction (X"), after which the driving unit 524 moves the bottom frame 521 and the storage bin 522 upwardly along the first direction (Z). On the other hand, the empty second camera lens-supporting tray 523 is moved from the temporary barrel-supporting unit 53 onto the accepting platform 543.

Referring to FIGS. 2, 11, 23, and 40, when each of the barrel-clamping units 13 rotates along the feeding direction (F) (see FIG. 33) to align with the camera lens-detecting unit 80 and during the stop period (I 3), the refection type optical fiber 82 of the camera lens-detecting unit 80 emits a light beam onto the corresponding barrel-clamping unit 13. When one of the camera lens units 400 is left on the corresponding barrel-clamping unit 13, it will reflect a return light beam back into the optical fiber 82, which, in turns, stop the operation of the automatic assembling system until the one of the camera lens unit 400 is removed from the corresponding barrel-clamping unit 13. As a consequence, the camera lens-detecting unit 80 can examine whether or not there is any of the camera lens units 400 that is not removed from the corresponding barrel-clamping unit 13 by the camera lens-removing device 51.

In view of the forgoing, the lenses (300A, 300B, 300C, 300D) can be placed accurately and quickly into the barrels 200 in sequence to form the camera lens units 400 by the automatic assembling system and method of this invention, thereby reducing significantly the manufacturing costs of the camera lens units 400.

With this invention thus explained, it is apparent that numerous modifications and variations can be made without departing from the scope and spirit of this invention. It is therefore intended that this invention be limited only as indicated by the appended claims.

We claim:

1. An automatic assembling system for camera lens units comprising:
   a main workstation including a plurality of barrel-clamping units operable cyclically and intermittently along a feeding direction
   a barrel-feeding station disposed adjacent to said main workstation and including a barrel-feeding device, and a barrel standby area adapted to receive a plurality of barrels, said barrel-feeding device cooperating with intermittent operations of said barrel-clamping units to move the barrels from said barrel standby area onto said barrel-clamping units in sequence;
   a lens-feeding assembly including at least one lens-feeding station disposed adjacent to said main workstation such that said barrel-feeding station and said lens-feeding station are arranged along said feeding direction, said lens-feeding station including a lens-feeding device, and a lens standby area adapted to receive a plurality of lenses, said lens-feeding device cooperating with the intermittent operations of said barrel-clamping units to move the lenses into the barrels respectively and sequentially so as to form the camera lens units; and
   a camera lens-removing station disposed adjacent to said main workstation such that said barrel-feeding station, said lens-feeding station, and said camera lens-removing station are arranged along said feeding direction, said camera lens-removing station including a camera lens-removing device, and a camera lens-collecting area, said camera lens-removing device cooperating with the intermittent operations of said barrel-clamping units to move the camera lens units from said barrel-clamping units into said camera lens-collecting area in sequence;
   wherein said barrel-feeding station further includes: a barrel storage unit including a plurality of barrel-supporting trays that are arranged one above another, that are adapted to receive the barrels thereon, and that are movable vertically along a first direction;

a temporary barrel-supporting unit disposed movably between said barrel storage unit and said barrel standby area and movable horizontally along a second direction;

a barrel standby unit disposed between said temporary barrel-supporting unit and said barrel-feeding device along said second direction and including a barrel standby platform that is movable horizontally along said second direction and a third direction that is perpendicular to said first and second directions; and a barrel transportation unit for moving one of said barrel-supporting trays from said barrel storage unit onto said temporary barrel-supporting unit along said second direction, said temporary barrel-supporting unit moving the one of said barrel-supporting trays onto said barrel standby platform of said barrel standby unit, after which said barrel-feeding device can move the barrels from the one of said barrel-supporting trays onto said barrel-clamping units in sequence.

2. The automatic assembling system as claimed in claim 1, wherein said lens-feeding station further includes:

a lens storage unit including a plurality of lens-supporting trays that are arranged one above another, that are adapted to receive the lenses thereon, and that are movable vertically along a first direction;

a temporary lens-supporting unit disposed movably between said lens storage unit and said lens standby area and movable horizontally along a second direction;

a lens standby unit disposed between said temporary lens-supporting unit and said barrel-feeding device and including a lens standby platform that is movable horizontally along said second direction and a third direction that is perpendicular to said first and second directions; and a lens transportation unit for moving one of said lens-supporting trays onto said temporary lens-supporting unit, said temporary lens-supporting unit moving the one of said lens-supporting trays onto said lens standby platform of said lens standby unit, after which said barrel-feeding device can move the barrels from the one of said lens-supporting trays onto said barrel-clamping units in sequence.

3. An automatic assembling system for camera lens units comprising:

a main workstation including a plurality of barrel-clamping units operable cyclically and intermittently along a feeding direction;

a barrel-feeding station disposed adjacent to said main workstation and including a barrel-feeding device, and a barrel standby area adapted to receive a plurality of barrels, said barrel-feeding device cooperating with intermittent operations of said barrel-clamping units to move the barrels from said barrel standby area onto said barrel-clamping units in sequence;

a lens-feeding assembly including at least one lens-feeding station disposed adjacent to said main workstation such that said barrel-feeding station and said lens-feeding station are arranged along said feeding direction, said lens-feeding station including a lens-feeding device, and a lens standby area adapted to receive a plurality of lenses, said lens-feeding device cooperating with the intermittent operations of said barrel-clamping units to move the lenses into the barrels respectively and sequentially so as to form the camera lens units; and a camera lens-removing station disposed adjacent to said main workstation such that said barrel-feeding station, said lens-feeding station, and said camera lens-removing station are arranged along said feeding direction, said camera lens-removing station including a camera lens-removing device, and a camera lens-collecting area, said camera lens-removing device cooperating with the intermittent operations of said barrel-clamping units to move the camera lens units from said barrel-clamping units into said camera lens-collecting area in sequence;

wherein said camera lens-removing station further includes:

a camera lens storage unit including a plurality of camera lens-supporting trays that are arranged one above another and that are movable vertically along a first direction;

a temporary camera lens-supporting unit disposed movably between said camera lens storage unit and said camera lens-collecting area and movable horizontally along a second direction;

a camera lens-accepting unit disposed between said temporary camera lens-supporting unit and said camera lens-removing device and including an accepting platform that is movable horizontally along said second direction and a third direction that is perpendicular to said first and second directions; and a camera lens transportation unit for moving one of said camera lens-supporting trays onto said temporary supporting unit, said temporary camera lens-supporting unit moving the one of said camera lens-supporting trays onto said accepting platform, after which said camera lens-removing device can move the camera lens units from said barrel-clamping units onto the one of said camera lens-supporting trays in sequence such that the camera lens units are placed at different positions of the one of said camera lens-supporting trays.

* * * * *